United States Patent [19]

Sawayama et al.

[11] Patent Number: 5,627,649
[45] Date of Patent: May 6, 1997

[54] METHOD AND DEVICE FOR CORRECTING A POSITION FOR WRITING AN IMAGE

[75] Inventors: Noboru Sawayama, Tokyo; Takashi Mama, Yokohama, both of Japan

[73] Assignee: Ricoh Company, Ltd., Tokyo, Japan

[21] Appl. No.: 77,381

[22] Filed: Jun. 17, 1993

Related U.S. Application Data

[63] Continuation-in-part of Ser. No. 959,094, Oct. 9, 1992, abandoned.

[30] Foreign Application Priority Data

Oct. 11, 1991 [JP] Japan ................................. 3-292128
Jun. 17, 1992 [JP] Japan ................................. 4-158246

[51] Int. Cl.$^6$ ............................. H04N 1/21; G01D 15/14; G01D 9/42
[52] U.S. Cl. ..................... 358/296; 347/116; 347/234; 250/235; 250/214.1; 358/302
[58] Field of Search ..................... 347/116, 234; 355/208, 272; 358/296, 302; 250/235, 214.1

[56] References Cited

U.S. PATENT DOCUMENTS

| | | | |
|---|---|---|---|
| 4,912,491 | 3/1990 | Hoshino et al. | 347/116 |
| 4,963,899 | 10/1990 | Resch, III | 347/116 |
| 5,076,163 | 12/1991 | Sainio | 101/181 |
| 5,325,154 | 6/1994 | Tayama et al. | 355/208 |
| 5,442,388 | 8/1995 | Schieck | 347/116 |

*Primary Examiner*—Michael L. Gellner
*Assistant Examiner*—Randy W. Gibson
*Attorney, Agent, or Firm*—Oblon, Spivak, McClelland, Maier & Neustadt, P.C.

[57] ABSTRACT

In an image forming apparatus, a method of correcting a position for writing an image on a photoconductive element on the basis of a signal representative of a pattern formed on the element and detected, and a device therefor. A single photoconductive element is used to form a plurality of different colored images using a single rotating polygonal mirror and a plurality of light sources. The toner images can be sensed either while they are on the single photoconductive element or by sensing them through a transport belt.

18 Claims, 33 Drawing Sheets

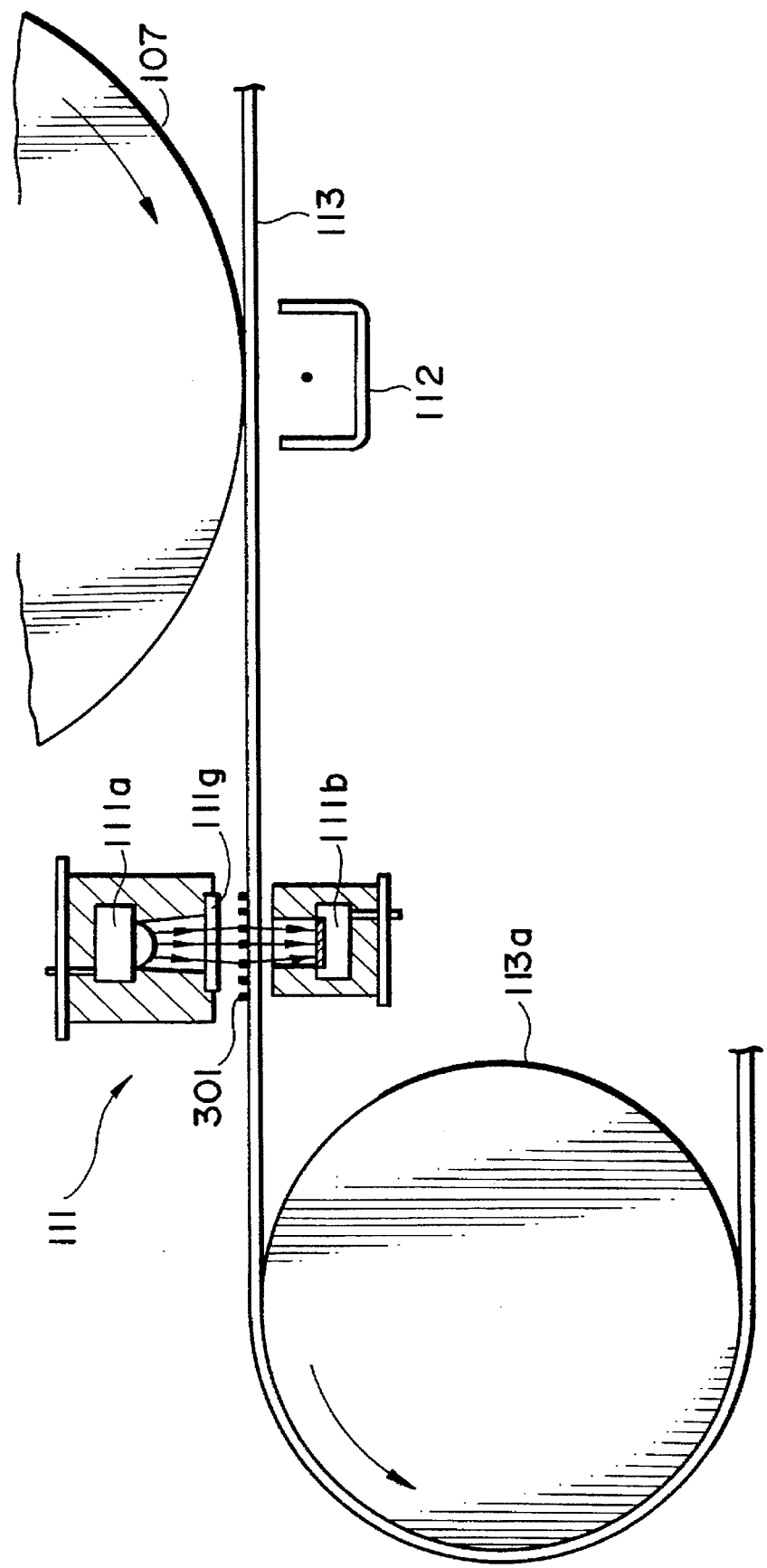

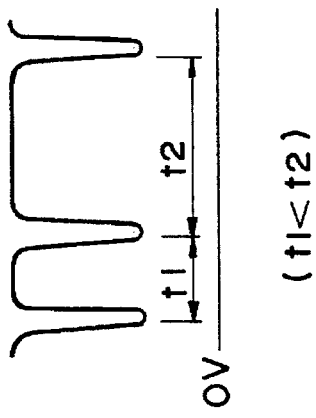
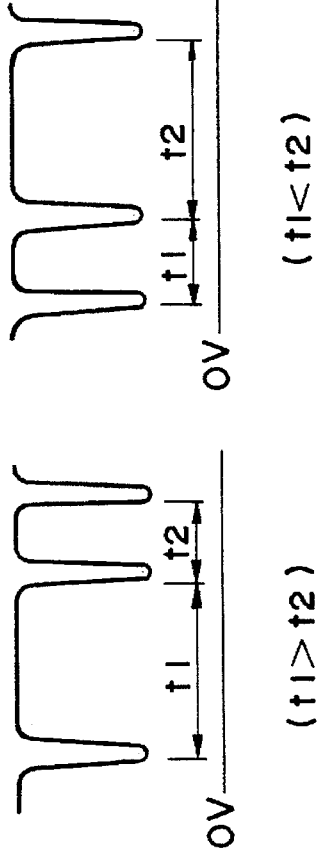
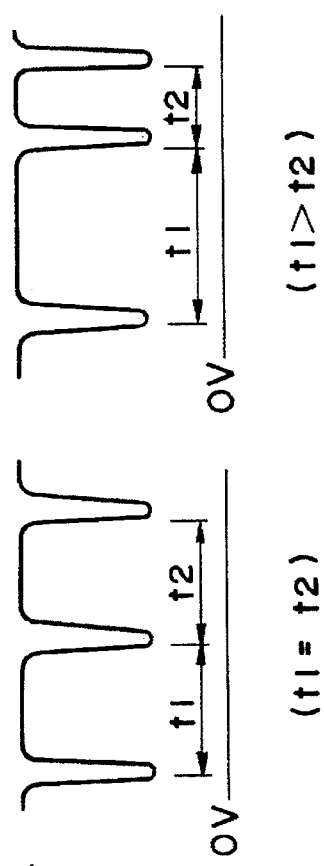
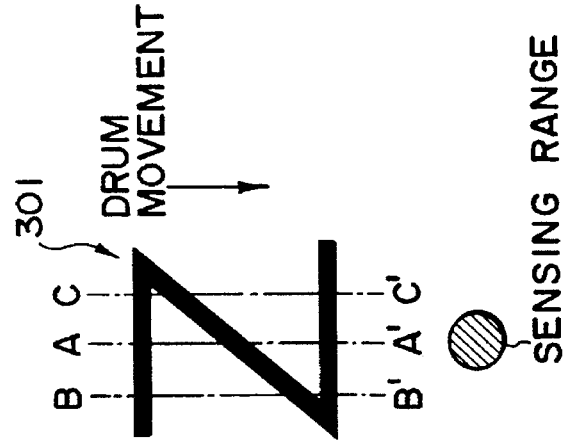

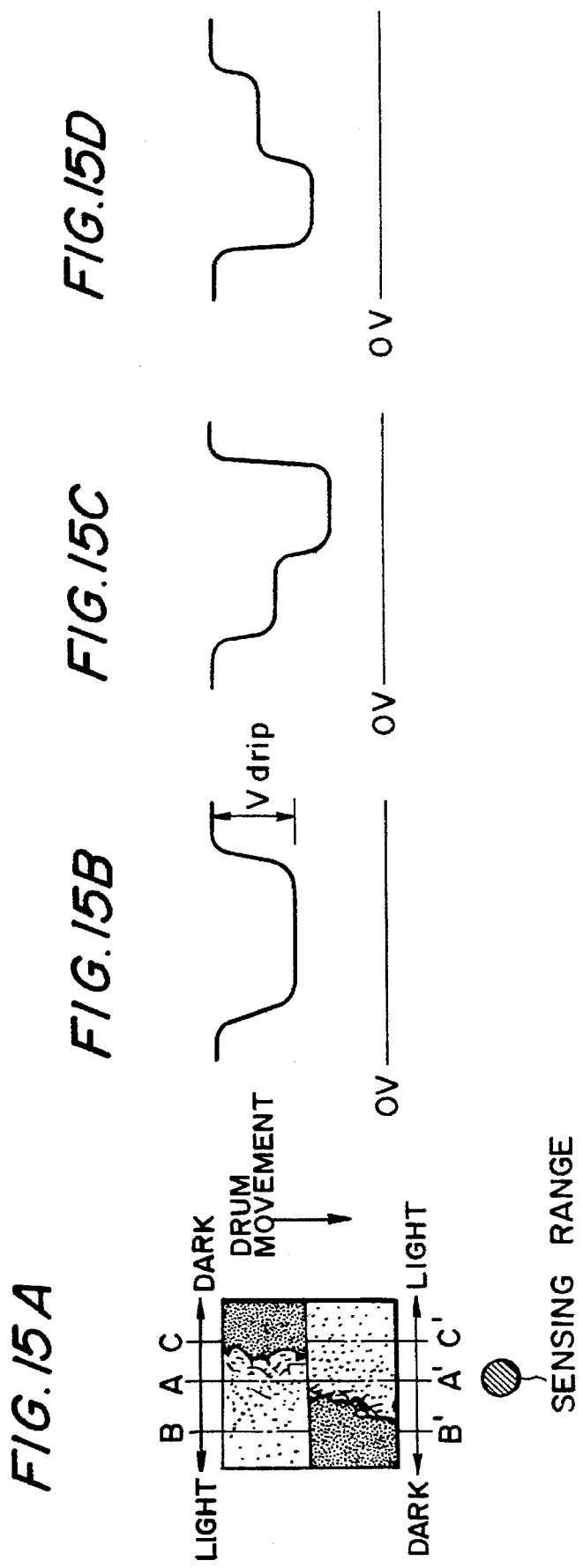

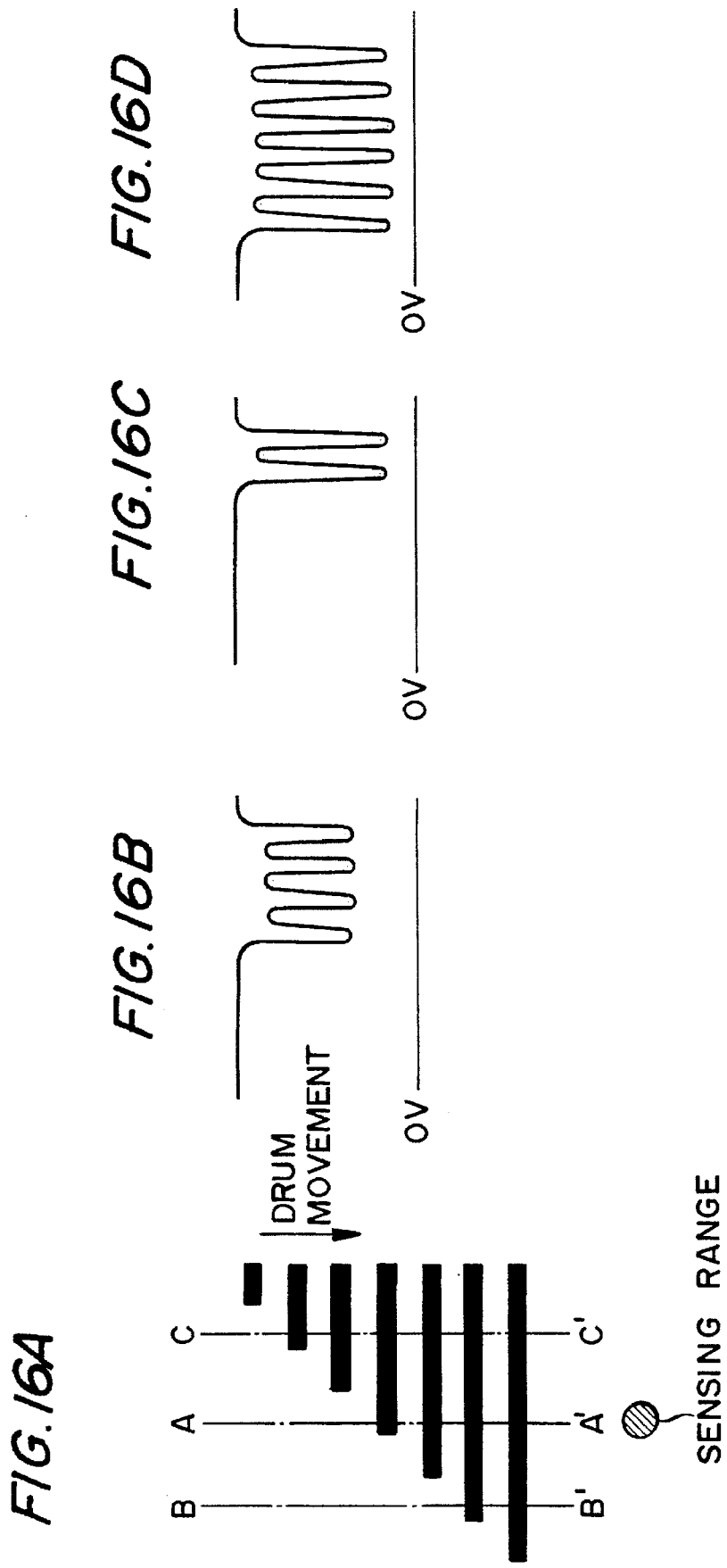

DRUM MOVEMENT

SENSING RANGE

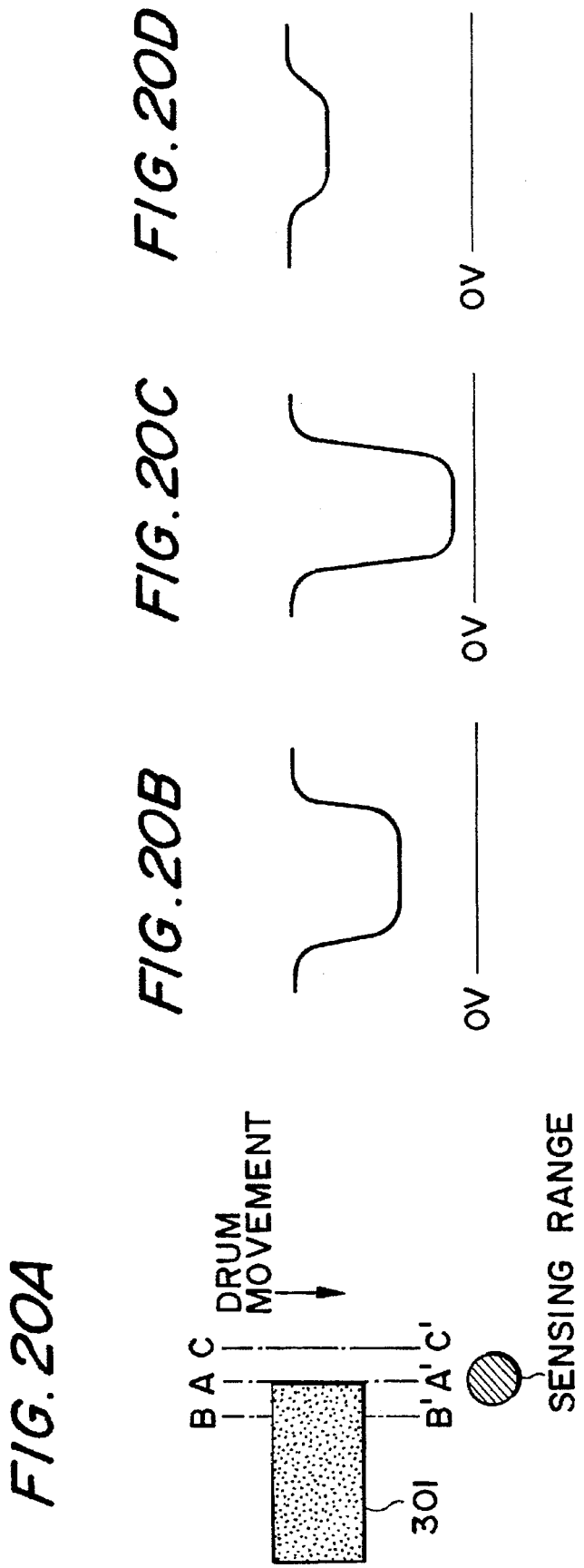

FIG. 23
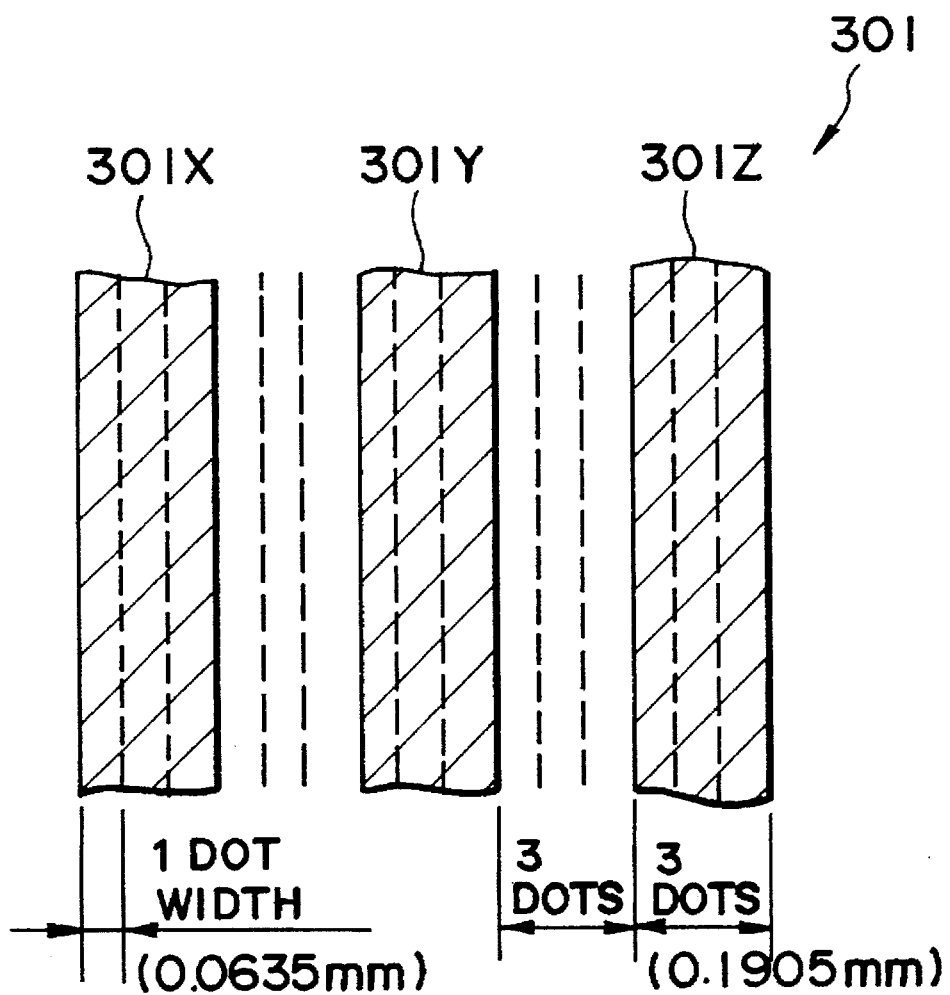
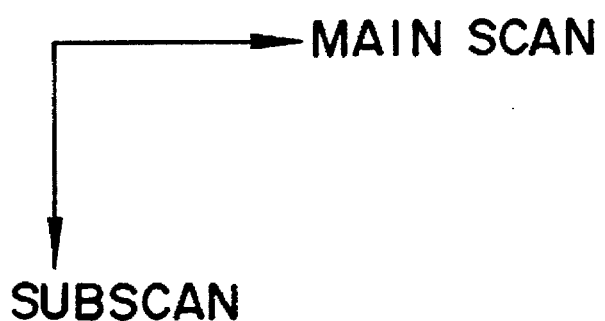

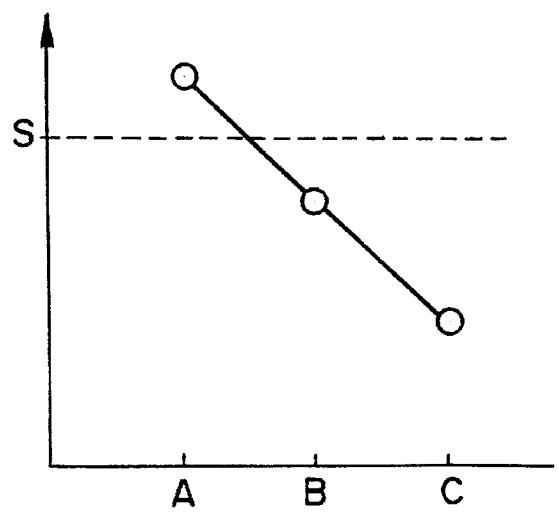
FIG.33 PATTERN SENSOR OUTPUT
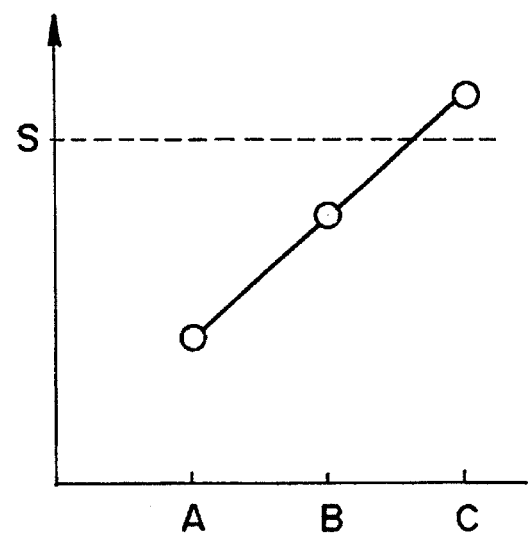
FIG.34 PATTERN SENSOR OUTPUT
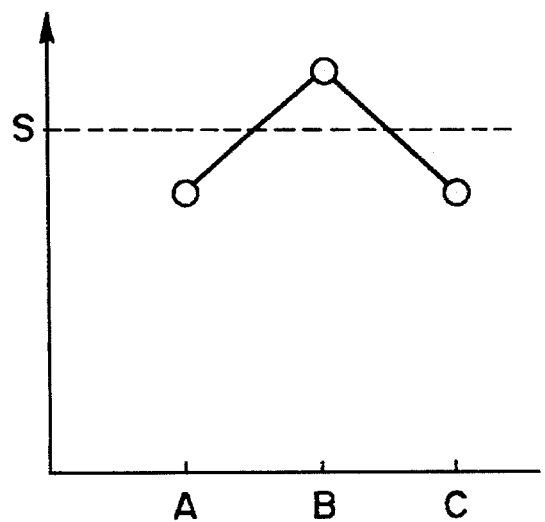
FIG.35 PATTERN SENSOR OUTPUT

301BK  301RD

301BK  301RD

METHOD AND DEVICE FOR CORRECTING A POSITION FOR WRITING AN IMAGE

CROSS REFERENCE TO RELATED APPLICATION

This application is a continuation-in-part of U.S. application Ser. No. 07/959,094, filed Oct. 9, 1992, which is now abandoned.

BACKGROUND OF THE INVENTION

The present invention relates to a method of correcting, in a laser printer, digital copier or similar image forming apparatus, a position for writing an image on a photoconductive element, and a device therefor.

A laser printer, for example, includes an optical writing unit for writing an image with a laser beam, and an image forming unit for forming an image. Usually, the writing unit is made up of a semiconductor laser, a collimator lens for collimating a laser beam issuing from the laser, a polygonal mirror provided with a mirror on each side of a regular polyhedron and rotated at high speed by a motor for steering the laser beam incident thereon, an f-theta lens for correcting the laser beam steered at an equal angular pitch by the polygonal mirror such that the beam scans the surface of a photoconductive drum at an equal linear pitch, a mirror for reflecting the laser beam onto the drum, a dust glass for preventing dust and other impurities from entering the writing unit, a synchronization sensor for sensing a position where a writing operation begins in the main scanning direction and implemented by, for example, a PIN photodiode, and a mirror for reflecting the laser beam toward the sensor. On the other hand, the image forming unit is made up of the photoconductive drum, a register roller for driving a recording medium, e.g., paper toward the drum such that the leading edge of the paper meets that of an image formed on the drum, a main charger for uniformly charging the surface of the drum by corona discharge, a developing unit for developing the latent image by a toner stored therein, a transfer charger for transferring the resulting toner image from the drum to the paper by corona discharge, a transport belt for transporting the paper carrying the toner image to a fixing section, a cleaning unit for removing the toner remaining on the drum after the image transfer with a cleaning blade, a fixing roller accommodating heater therein and having the surface thereof made of a heat-resistive and highly separable material and rotatable while being heated to a predetermined temperature, a pressure roller pressed against the fixing roller by a predetermined pressure, a paper cassette loaded with a stack of papers, a pick-up roller for feeding the papers one by one from the cassette, and a discharge roller for driving the paper having the toner image thereof fixed by the two rollers out of the printer to a tray.

A bicolor image forming apparatus is also extensively used. For example, in a conventional bicolor laser printer, laser beams issuing from a semiconductor laser and associated with image signals of respective colors are each steered in a particular direction by the polygonal mirror to scan the drum. Specifically, the laser beam associated with a first color is optically corrected by the f-theta lens and then directed toward the drum by the mirror. As a result, a latent image is electrostatically formed on the surface of the drum. A first developing unit develops the latent image by a toner of first color. Subsequently, the laser beam associated with a second color is incident to the drum to form an electrostatic latent image. Then, a second developing unit develops this latent image by a toner of second color.

Japanese Patent Laid-Open Publication (Kokai) No. 300259/1988 discloses an image forming apparatus comprising an image carrier for forming thereon, moving means movable for transferring the image from the image carrier at an image transfer station, means for sensing a register mark forming area provided on the moving means and implemented by a transparent body and a register mark formed in the register mark forming area, and correcting means for correcting the position of an image on the image carrier in response to an output signal of the sensing means. The sensing means is constituted by a mono or bidimensional imaging device, e.g., CCDs (Charge Coupled Devices) or MOS (Metal Oxide Semiconductor). Japanese Patent Laid-Open Publication No. 141746/1989 teaches a register mark reading device applicable to an image forming apparatus of the type having a plurality of image carriers and sequentially transferring images formed on the image carriers one above another to a paper being transported. The register mark reading device includes mark reading means for reading a main scan register mark and a subscan register mark formed on each image carrier and transferred to a movable body. Specifically, the mark reading means is implemented as a mark sensor in the form of CCDs. The mark sensor is linearly arranged to intersect the main scan and subscan register marks at a predetermined angle.

However, the problem with the conventional laser printer is that the relative position between the drum and the optical writing unit changes due to changes in the temperature inside the printer. At the same time, the positions of the laser, polygonal mirror, f-theta lens and mirror arranged in the writing unit change relative to one another due to the temperature changes. Such changes in position directly translate into changes in the positions of beam spots on the drum as well as changes in the writing width available with the beam. As a result, the images are dislocated and/or changed in width on the paper, failing to achieve desirable quality.

The conventional bicolor laser printer also has the above-described problem, i.e., the images of respective colors are brought out of register on the drum.

To eliminate the above problem, the image forming apparatus and the register mark reading device disclosed in the previously stated Laid-Open Publications each uses CCDs for sensing a toner This, however, brings about image. another problem that an exclusive drive circuit for the CCDs is needed, obstructing the miniaturization of the apparatus and increasing the cost.

SUMMARY OF THE INVENTION

It is therefore an object of the present invention to provide a method of correcting a position for writing an image on a photoconductive element included in an image forming apparatus, and a device therefor.

It is another object of the present invention to provide a method of correcting, in an image forming apparatus, an image writing position on the basis of a signal representative of a pattern formed on a photoconductive element and detected, and a device therefor.

In accordance with the present invention, a device for correcting a position for writing an image on a photoconductive element included in an image forming apparatus comprises a pattern forming section for forming a predetermined pattern image in a non-image area of the photoconductive element, a pattern sensor for optically reading the pattern image, and a writing position adjusting sedtion for adjusting an image writing position in response to an output signal of the pattern sensor representative of the pattern image.

Also, in accordance with the present invention, a method of correcting a position for writing an image on a photoconductive element included in an image forming apparatus comprises the steps of writing a plurality of images of different colors on the photoconductive element by an optical writing section to electrostatically form corresponding latent images, developing each of the latent images by a toner of particular color by a developing section to form a corresponding toner image, illuminating the resulting toner images and sensing reflections from the toner images by an optical sensor, and correcting a position for writing an image on the photoconductive element by the optical writing section on the basis of the sensed reflections.

Further, in accordance with the present invention, a method of correcting a position for writing an image on a photoconductive element included in an image forming apparatus comprises the steps of writing a plurality of images of different colors on the photoconductive element by an optical writing section to electrostatically form corresponding latent images, developing each of the latent images by a toner of particular color by a developing section to form a corresponding toner image, illuminating the resulting toner images and sensing transmitted light from the toner images by an optical sensor, and correcting a position for writing an image on the photoconductive element by the optical writing section on the basis of the sensed reflections.

BRIEF DESCRIPTION OF THE DRAWINGS

The above and other objects, features and advantages of the present invention will become more apparent from the following detailed description taken with the accompanying drawings in which:

FIGS. 9–12 are sections each showing a specific construction of a pattern sensor applicable to the embodiment;

FIGS. 20A–20D show output voltages of a transmission type sensor also applicable to the embodiment;

FIG. 23 is a fragmentary plan view of a specific toner image pattern applicable to the second embodiment;

FIGS. 33–37 show the outputs various kinds of pattern sensors;

DESCRIPTION OF THE PREFERRED EMBODIMENTS

Figure 1:
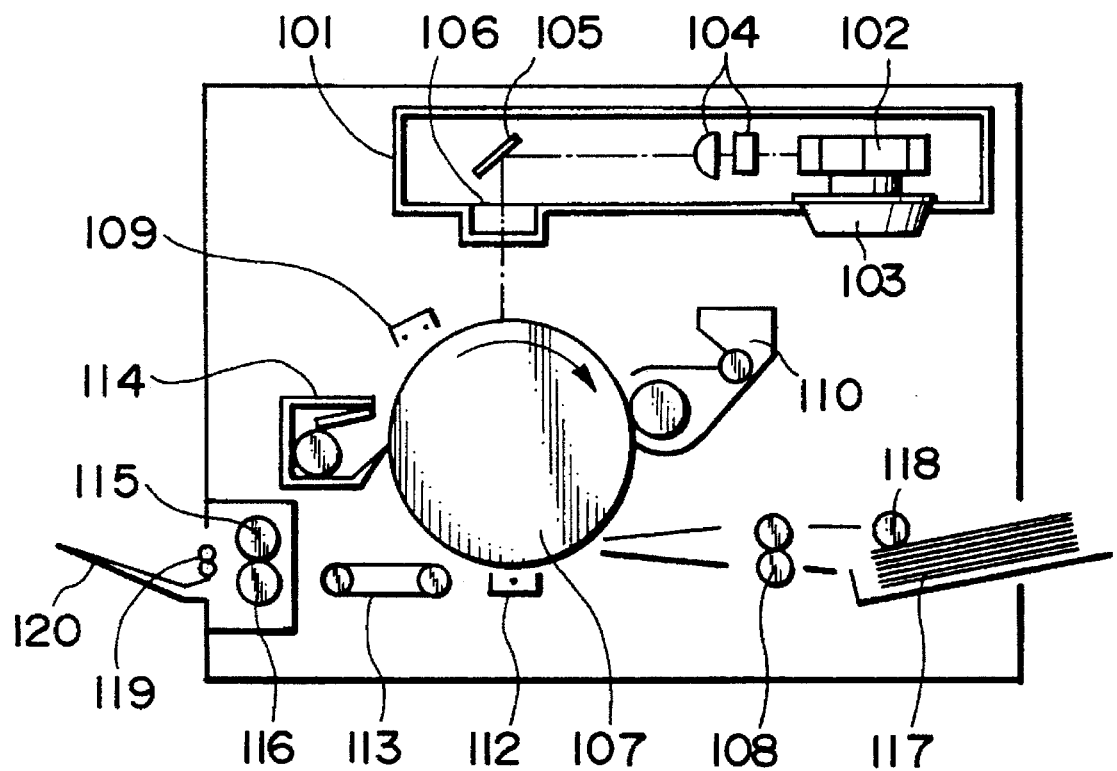
FIG. 1 shows the general construction of a conventional laser printer.

To better understand the present invention, a brief reference will be made to a conventional laser printer, shown in FIG. 1. As shown, the laser printer has an optical writing unit 101 using a laser beam. Specifically, a polygonal mirror 102 is provided with a mirror on each side of a regular polyhedron and rotated at high speed by a motor 103 for steering a laser beam incident thereon. An f-theta lens 104 corrects the laser beam steered at an equal angular pitch by the polygonal mirror 102 such that the beam scans the surface of a photoconductive drum at an equal linear pitch. A mirror 105 reflects the laser beam onto the drum 107. A dust glass prevents dust and other impurities from entering the writing unit 101. FIG. 2 shows a relation between the optical writing and the drum scanning. There are shown in FIG. 19 a semiconductor laser 201 for emitting a modulated laser beam, a collimating lens 202 for collimator for collimating the laser beam issuing from the laser 201, a synchronization sensor for sensing a position where a writing operation begins in the main scanning direction and implemented by, for example, a PIN photodiode, and a mirror 204 for reflecting the laser beam toward the sensor 203.

Referring again to FIG. 1, an electrostatic latent image is formed on the surface of the drum 107 by an electrophotographic process. A register roller 108 drives a recording medium, e.g., paper toward the drum 107 such that the leading edge of the paper meets that of an image formed on the drum 107. A main charger 109 uniformly charges the surface of the drum 107 by corona discharge. A developing unit 110 develops the latent image by a toner stored therein. A transfer charger 112 transfers the resulting toner image from the drum 107 to the paper by corona discharge. A transport belt 113 transports the paper carrying the toner image to a fixing section. A cleaning unit 114 removes the toner remaining on the drum 107 after the image transfer with a cleaning blade. Located at the above-mentioned fixing section are a fixing roller 115 and a pressure roller 116. The fixing roller 115 accommodates a heater therein and has the surface thereof made of a heat-resistive and highly separable material. The fixing roller 115 is rotated while being heated to a predetermined temperature. The pressure roller 116 is pressed against the fixing roller 115 by a predetermined pressure. A paper cassette 117 is loaded with a stack of papers. A pick-up roller 118 feeds the papers one by one from the cassette 117. A discharge roller 119 drives the paper having the toner image thereof fixed by the rollers 115 and 116 out of the printer to a tray 120.

In operation, the laser 201 emits a laser beam on the basis of an image signal applied to the writing unit 101 via an image processor, not shown. The laser beam issuing from laser 201 and having a certain angle is collimated by the collimator lens 202 and then incident to the polygonal mirror 102 which is rotating at a predetermined speed. The laser beam from the polygonal mirror 102 is optically corrected by the f-theta lens 104 such that the beam has an equal linear pitch on the drum 107. Before the laser beam reaches the drum 107, the drum 107 is uniformly charged by the main charger 109. As a result, the laser beam forms an electrostatic latent image on the drum 107 in the form of a potential distribution. The latent image is developed by the toner stored in the developing unit 110. A paper fed by the pick-up roller 118 is driven toward the drum 107 by the register roller 108 at the previously mentioned particular timing. The transfer charger 112 transfers the toner image from the drum 107 to the paper. After the toner image has been fixed on the paper by the fixing roller 115 and pressure roller 116, the paper is driven out to the tray 120 by the discharge roller 119. The cleaning unit 114 removes the toner remaining on the drum 107 after the image transfer, and then a discharge lamp, not shown, removes the charge also remaining on the drum 107. In this condition, the printer awaits the next image process command.

Figure 3:
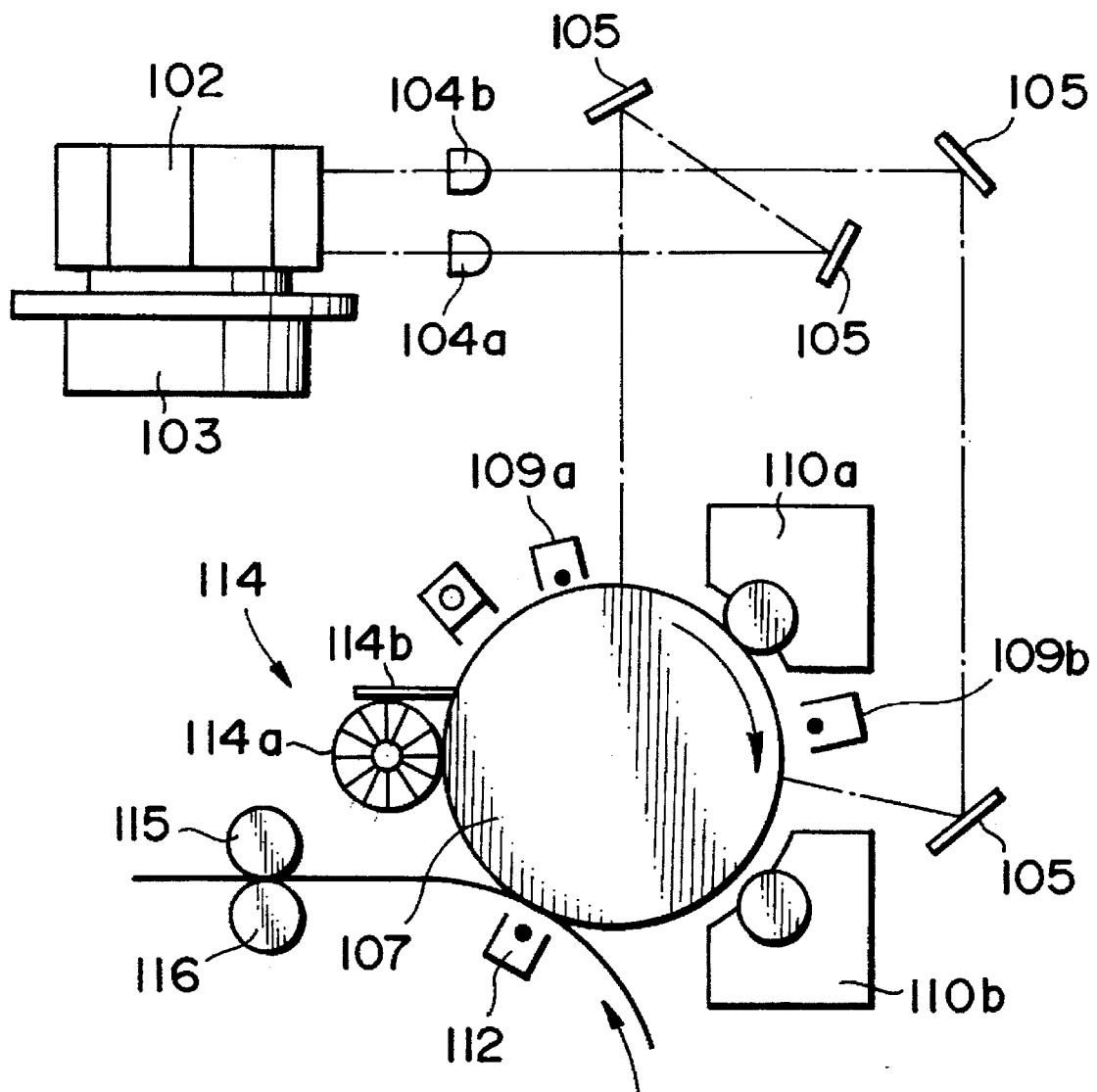
FIG. 3 is a section showing essential part of a conventional bicolor laser printer.

Referring to FIG. 3, major part of a conventional bicolor laser printer is shown. As shown, laser beams issuing from a semiconductor laser, not shown, and associated with image signals of respective colors are each steered in a particular direction by the polygonal mirror 102 to scan the drum 107. Specifically, the laser beam associated with a first color is optically corrected by an f-theta lens 104a and then directed toward the drum 107 by mirrors 105. As a result, a latent image is electrostatically formed on the surface of the drum 107 having been uniformly charged by a main charger 109a in the form of a charge distribution. A first developing unit 110a develops the latent image by a toner of first color. After the surface of the drum 107 has been uniformly charged by another main charger 109b, the laser beam associated with a second color routed through an f-theta lens 104b and mirrors 105 is incident to the drum 107 to form an electrostatic latent image thereon. Then, a second developing unit 110b develops this latent image by a toner of second color. A paper fed from a paper feed section, not shown, is brought into register with the resulting composite bicolor image existing on the drum 107. The transfer charger 112 transfers the bicolor toner image from the drum 107 to the paper. After the toner image been fixed on the paper, the paper is driven out to a discharge section, not shown. The cleaning unit 114 is made up of a cleaning brush 114a and a cleaning blade 114b and removes the toner remaining on the drum 107 after the image transfer, as stated earlier.

Figure 2:
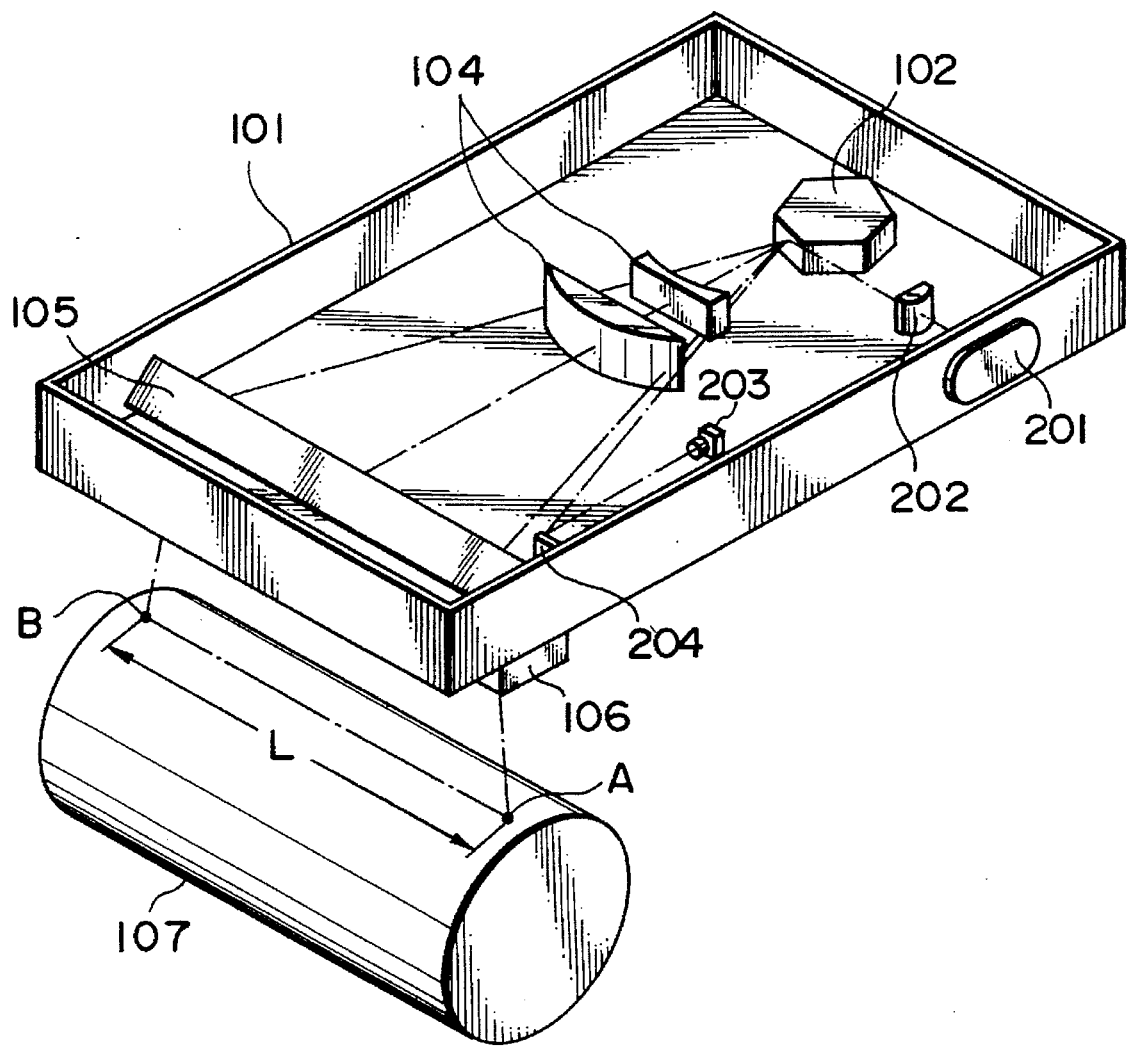
FIG. 2 is an external view of an optical writing unit included in the conventional laser printer.

The problem with the conventional arrangements shown in FIGS. 1 and 2 is that the relative position between the drum 107 and the optical writing unit 101 changes due to changes in the temperature inside the printer. At the same time, the positions of the laser 201, polygonal mirror 102, f-theta lens 104 and mirror 105 arranged in the writing unit change relative to one another due to the temperature changes. As shown in FIG. 2, such changes in position directly translate into changes in the positions of beam spots (points A and B) on the drum 107 as well as changes in the writing width (distance L) available with the beam. As a result, the images are dislocated and/or changed in width on the paper, failing to achieve desirable quality. Particularly, in the image forming apparatus of FIG. 3, the images of respective colors are brought out of register on the drum 107.

Preferred Embodiments of the present invention will be described which are free from the problems discussed above.

1st Embodiment

Figure 4:
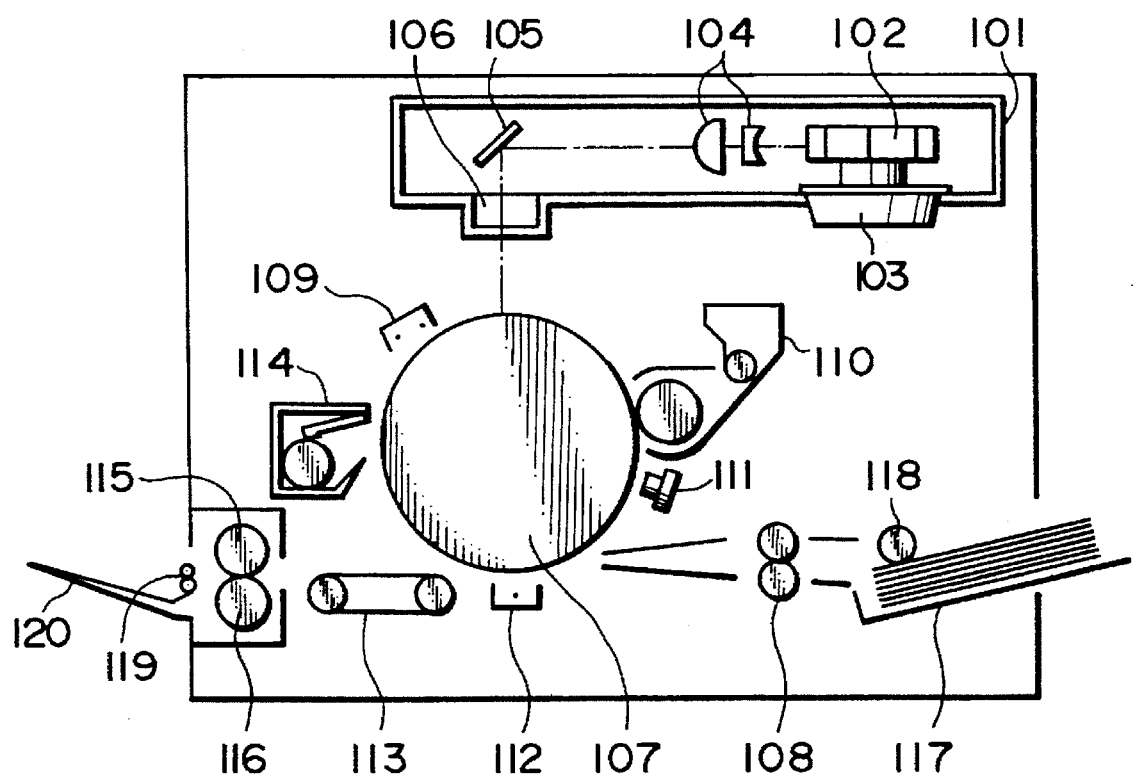
FIG. 4 is a section showing the general construction of a laser printer with which a first embodiment of the present invention is practicable.

This embodiment is applied to the laser printer shown in FIG. 1. As shown in FIG. 4, the laser printer is generally similar to the laser printer of FIG. 1 except for the addition of a pattern sensor 111. The pattern sensor 111 optically senses a pattern image formed on the photoconductive drum 107, as will be described layer. Therefore, the construction and operation of the laser printer will not be described specifically to avoid redundancy.

Figure 5:
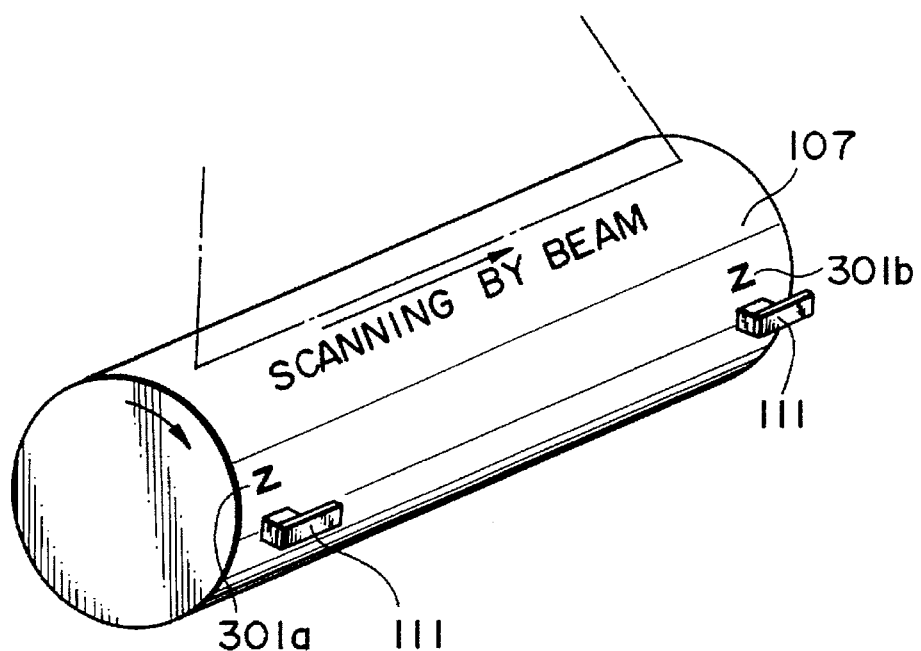
FIG. 5 is a view indicative of a positional relation between a pattern sensor and a photoconductive drum included in the printer of FIG. 4.

FIG. 5 shows a positional relation between the pattern sensors 111 and the drum 107 particular to the illustrative embodiment. As shown, two pattern sensors 111A and 111B are respectively located at the beginning and the end of the same scanning line in the main scanning direction. Pattern images 301a and 301b are formed on the drum 107 to be individually sensed by the pattern sensors 111A and 111B, respectively. The pattern images 301a and 301b, like the pattern sensors 111A and 111B, are located at the beginning (301a) and the end (301b) of the same scanning line in the main scanning direction.

How to set a position for starting writing an image on the drum 107 by an optical writing unit 101 is as follows. To maintain the write start position in the main scanning direction constant throughout the lines, the arrival of the laser beam at a particular position is detected during prescanning which precedes actual image writing, and t h e resulting signal is output. Specifically, as shown in FIG. 2, a synchronization sensor 203 is incorporated in the writing unit 101 and receives the laser beam reflected by a mirror 204 to output a detection signal. Scanning of the drum 107 begins on the elapse of a predetermined period of time after the sensor 203 has generated the detection signal. The predetermined period of time is variable to adjust the writing position.

Figure 6:
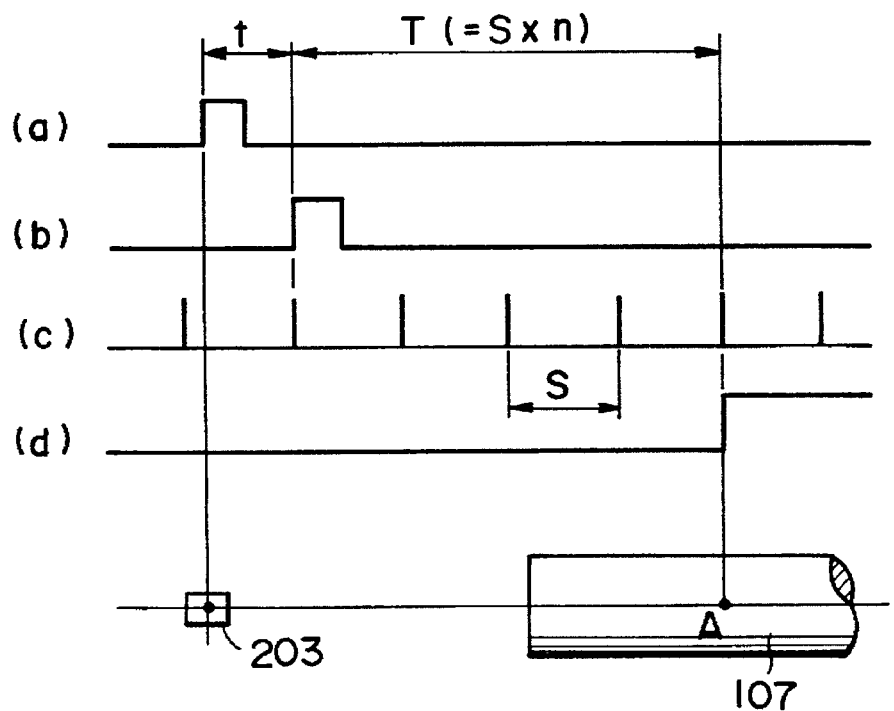
FIG. 6 is a timing chart representative of an output signal of a synchronization sensor included in the embodiment and a write start signal.

FIG. 6 is a timing chart showing the output signal (a) of the synchronization sensor 203, an output signal (b) produced by delaying the signal (a) by a period of time t, an image clock (c) synchronous with the signal (b), and a write start signal (d). The write start signal (d) is generated when the image clock (c) having a period S is counted n (integer) times after the output of the delayed signal (b), i.e., on the elapse of a period of time T=S×n. The writing operation begins at a point A on the surface of the drum 107. It is to be noted that the write start position A is variable by changing the count n and delay time t.

Figure 7:
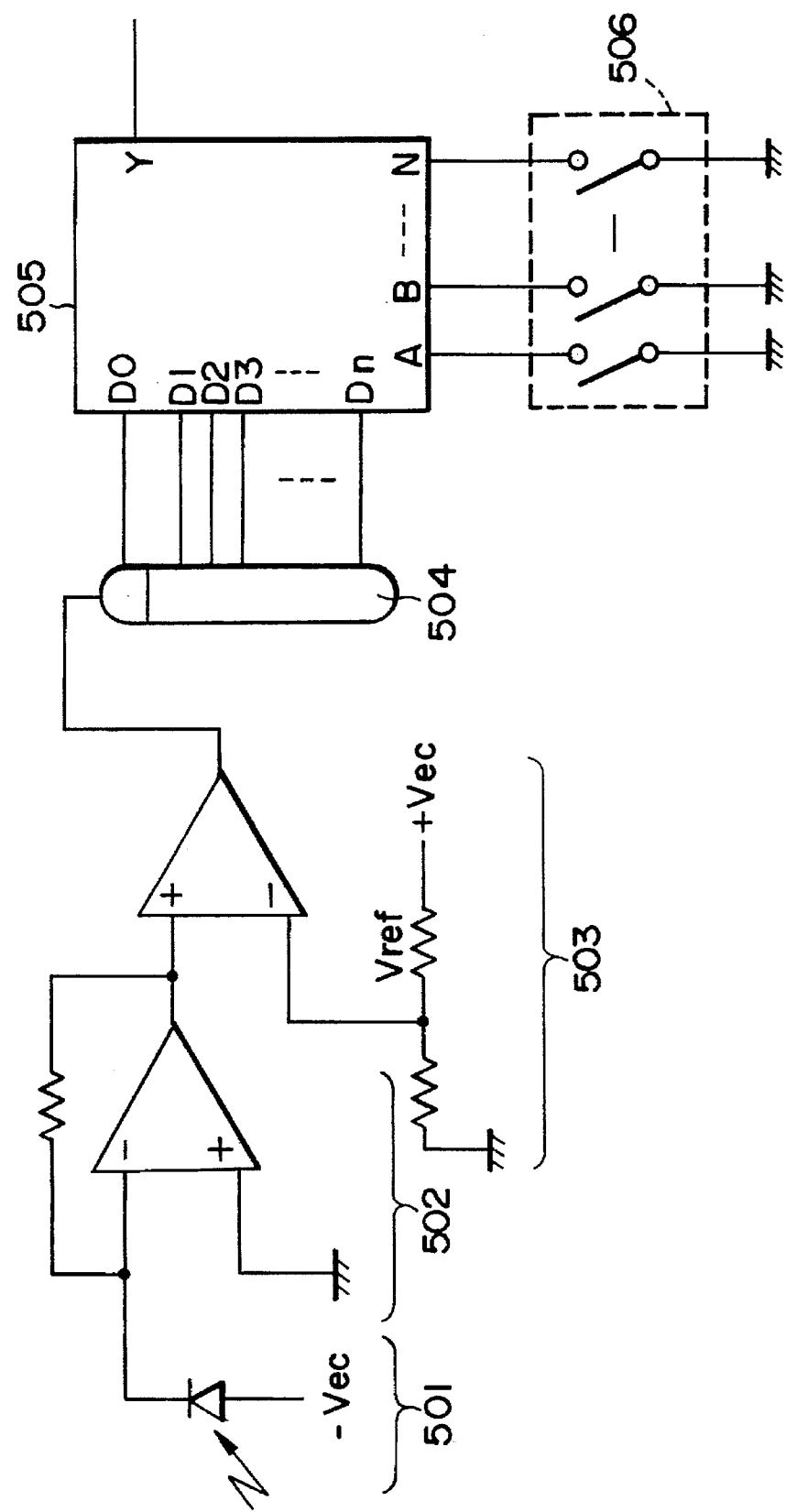
FIG. 7 is a block diagram schematically showing a circuitry included in the embodiment for setting a write start signal.

FIG. 7 shows specific circuitry for setting the above-mentioned write start signal particular to the embodiment. As shown, the circuitry has a PIN photodiode 501 constituting the synchronization sensor 203, an amplifying section 502 for amplifying the output signal of the photodiode 501, a shaping section 503 for shaping the waveform of the output signal of the amplifying section 502, a delay line 504 for setting the delay time t, a data selector 505 for selecting one of the delay times of the delay line 504, and a switch 506 for switching over the selection signal of the data selector 505 in response to, for example, a signal sent from the outside of the circuitry. In operation, the output of the PIN photodiode 501 having sensed the laser beam is amplified by the amplifying section 502, shaped by the shaping section 503, and then applied to the delay line 504. As a result, the delay line 504 produces signals each having a particular delay time, and such signals are fed to the data selector 505. As the data selection signal of the data selector 505 is provided with a desired value from the outside via the switch 506, the data selector 505 produces a signal having a desired delay time. The image clock synchronous with the delayed signal may be generated by a conventional clock generating circuit, e.g., one disclosed in Japanese Patent Publication No. 162673/1981 or No. 153259/1985.

Figure 8:
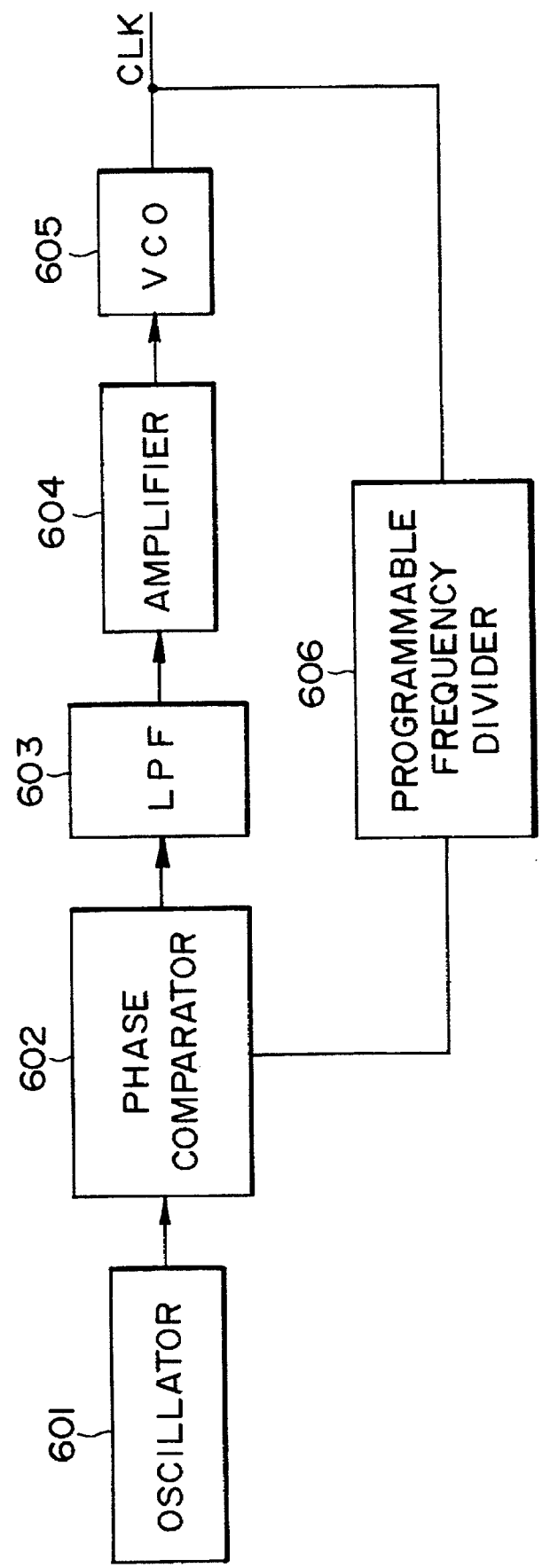
FIG. 8 is a block diagram schematically showing control circuitry for changing the image recording width or magnification.

FIG. 8 shows specific circuitry included in the embodiment for changing the image recording width, i.e., magnification. As shown, the circuitry has an oscillator 601 for outputting an oscillation frequency, a phase comparator 602, a low pass filter (LPF) 603, an amplifier 604 for amplifying the output of the low pass filter 603, a voltage controlled oscillator (VCO) 605, and a programmable frequency divider 606 for setting a frequency division ratio. The block made up of these constituents 601–606 is generally known as a PLL (Phase Locked Loop) control circuit. Assume that the oscillation frequency of the oscillator 601 is $f_o$, and that the frequency division ratio of the frequency divider 606 is 1/N. Then, the frequency of a clock CLK is $Nf_o$. Specifically, assuming that the frequency division ratio of the frequency divider 606 is 1/(N+1), i.e., data N+1 is applied to the frequency divider 606, then the frequency of the clock CLK is variable by $(N+1)f_o - Nf_o = f_o$. By so changing the data to be applied to the frequency divider 606, it is possible to change the frequency of the image clock and, therefore, the recording width or magnification of an image at the stage of the output frequency $f_o$ of the oscillator 601.

The write start position in the main scanning direction is detected on the basis of the output signal of the pattern sensor 111A (located on the beginning side) representative of the pattern image 301a. A deviation between the detected write position and a reference position is calculated. A correction signal $H_A$ corresponding to the deviation is output. Further, on the basis of the correction signal $H_A$, the count n of the image clock and the delay time t are corrected to set up a desired write start position, as described with reference to FIG. 6. Likewise, a write end position in the main scanning direction is detected on the basis of the output of the other pattern sensor 111B (located on the end side) representative of the pattern image 301b. A deviation between this end position and a reference position is detected and produced as a correction signal $H_B$. The data to be applied to the programmable frequency divider 606 and, therefore, the recording width is changed in response to the correction signal $H_B$, whereby a desired write end position is set up, as described with reference to FIG. 8. It is to be noted that a single pattern sensor may be located only on the beginning side of the scanning line to detect and correct only the write start position, if necessary.

Some specific configurations of the pattern sensor 111 applicable to the embodiment are as follows.

Figure 9:
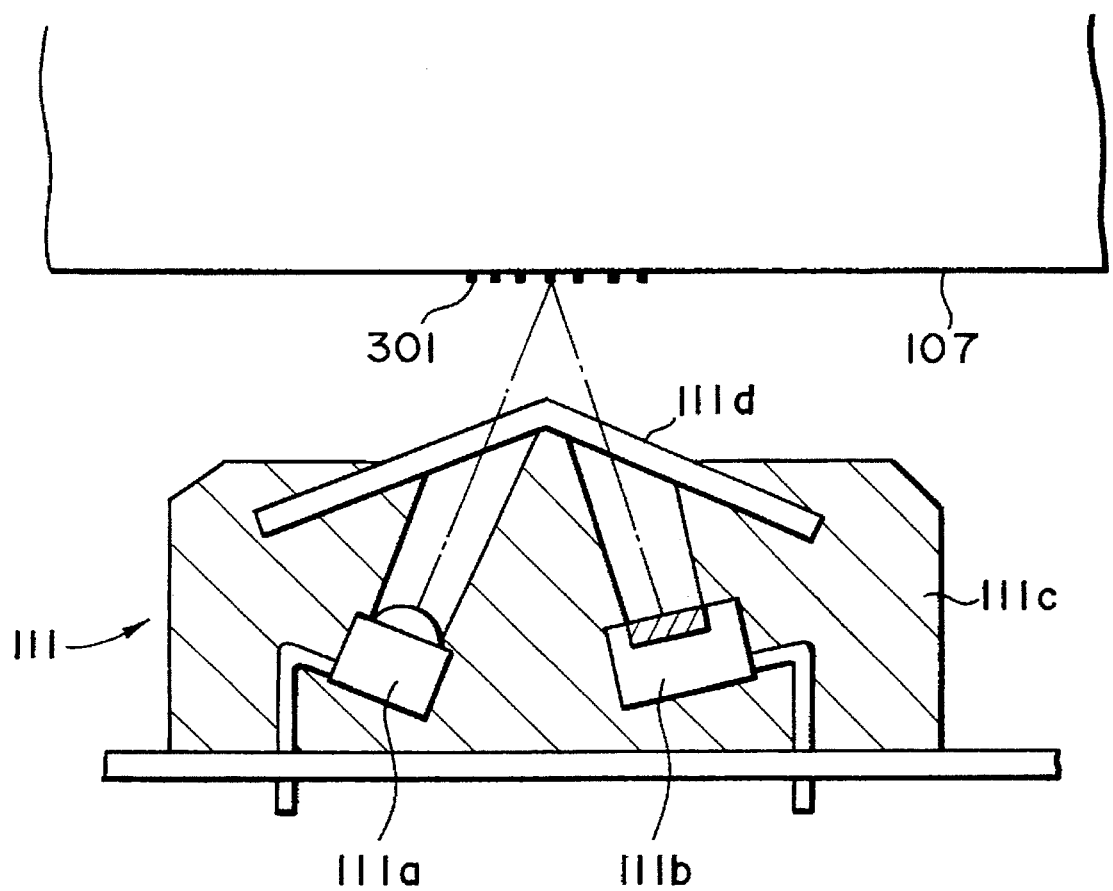

FIG. 9 shows a configuration wherein the pattern sensor 111 has a support member 111c and a light emitting element 111a and a light-sensitive element 111b which are received in the support member 111c. The two elements 111a and 111b are symmetrical to each other with respect to the drum 107. Optical paths are formed in the support member 111c to implement a restriction. A cover glass 111d is fitted on the front of the support member 111c that faces the drum 107. As the light emitting element 111a emits light to illuminate a toner image pattern 301 formed on the drum 107, the resulting regular reflection is incident on the light-sensitive element 111b. At this instant, diffused reflection is almost entirely intercepted by the support member 111c and does not reach the light-sensitive element 111b.

Figure 10:
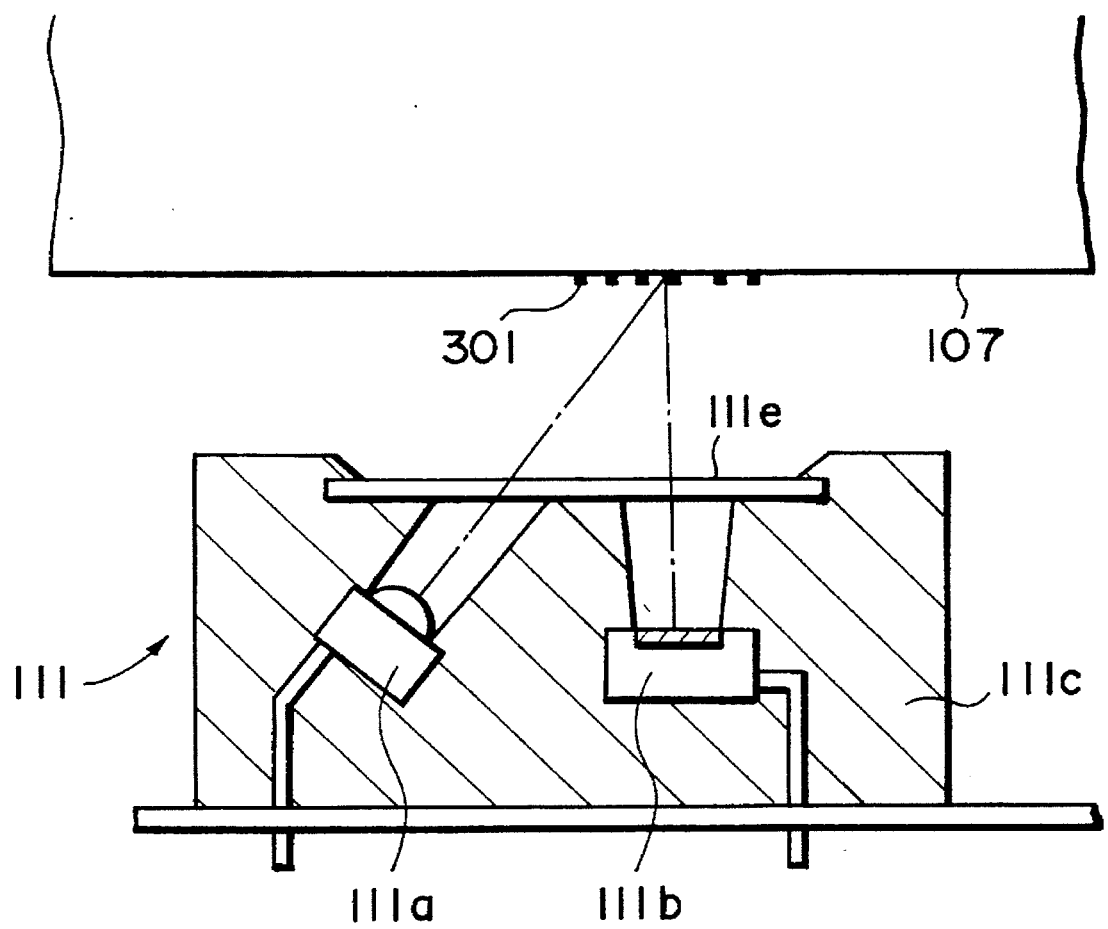

FIG. 10 shows another configuration wherein the light emitting element 111a and light-sensitive elements are also received in the support member 111c to face the drum 107. A cover glass 111e is fitted on the front of the support member 111c. In this configuration, the light emitting element 111a illuminates the toner image pattern 301 on the drum 107 obliquely. The light-sensitive element 111b is so located as to receive the resulting diffused reflection from the drum 107, but not the regular reflection.

Figure 11:
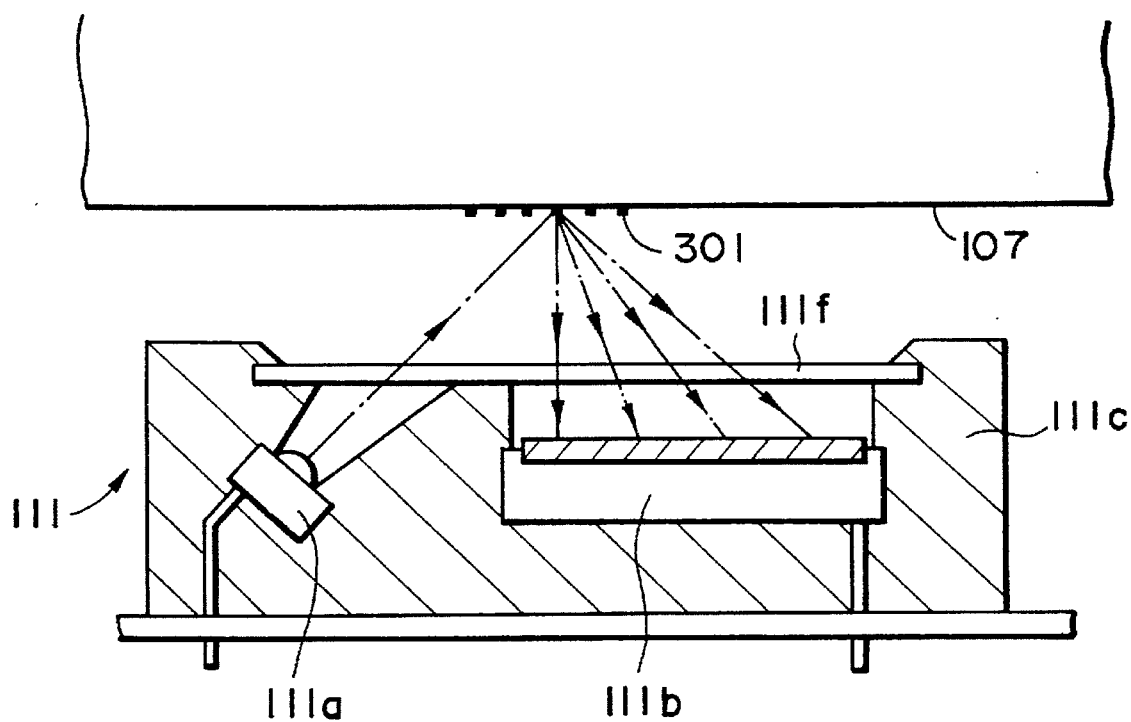

FIG. 11 shows still another configuration wherein the light emitting element 111a and the light-sensitive element 111b having a broad light-sensitive area are received in the support member 111c. A cover glass 111f is fitted on the front of the support member 111c that faces the drum 107. As the light emitting element 111a illuminates the toner image pattern 301 on the drum 107 obliquely, the resulting regular reflection and diffused reflection both are incident on the light-sensitive element.

FIG. 12 show a further configuration wherein the light emitting element 111a and light-sensitive element 111b are located on opposite sides of the transport belt 113. The light emitting element 111a issues non-diffused light to the toner image 301 on the transport belt 113 via a cover glass 111g. The resulting non-diffused light transmitted through the belt 113 is incident on the light-sensitive element 111b. The belt 113 is passed over a drive roller 113a and other rollers and driven by the drive roller 113a in a rotary motion.

Some examples of the pattern image 301 of the illustrative embodiment and associated sensor outputs will be described with reference to FIGS. 13A–13D, 14A–14D, 15A–15D, 16A–16D and 17A–17D. Assume that the detection signals are derived from the regular reflection type pattern sensor shown in FIG. 9.

Figure 13B:
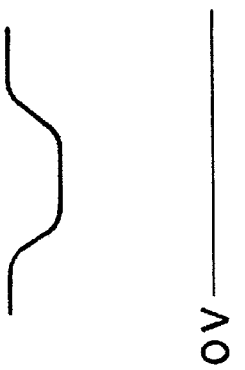
FIGS. 13A–13D to 17A–17D show specific patterns and associated sensor outputs.
Figure 13C:
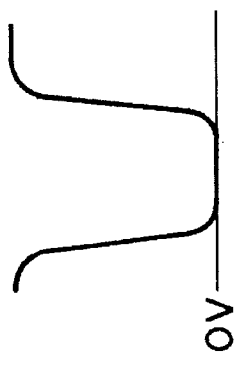
Figure 13D:
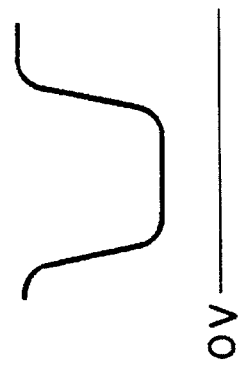
Figure 13A:
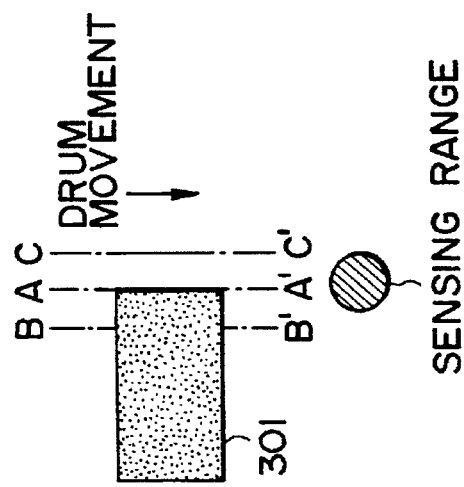

FIGS. 13A–13D show a first specific pattern image and sensor outputs associated therewith. Specifically, FIG. 13A shows a pattern image in the form of a simple rectangular pattern whose longer edges extend in the main scanning direction. The center of the write start signal, i.e., the center of the delay time t of the output of the synchronization sensor 203 is selected such that the target image forming position of one of opposite vertical edges of the solid pattern coincides with the center line A-A' of the sensing range of the pattern sensor 111. When the actual writing position is coincident with the target image forming position, the sensor 111 outputs voltages shown in FIG. 13B. When the sensing range of the sensor 111 is located on a line B-B', FIG. 13, the sensor 111 outputs voltages shown in FIG. 13C which are lower than the voltages shown in FIG. 13B. Further, when the sensing range of the sensor 111 is located on a line C-C', FIG. 13A, the sensor 111 outputs voltages shown in FIG. 13D which are higher than the voltages shown in FIG. 13B. Hence, the delay time t is increased or decreased to cause the output voltage of the sensor 111 to coincide with the target voltage, whereby the write position (strictly, position relative to the sensor 111) is maintained constant.

FIGS. 14A–14D show a second specific pattern image and detection signals associated therewith. The pattern image shown in FIG. 14A is a letter Z. In this case, the center of the write start signal, i.e., the center of the delay time t is selected such that the target image forming position of the center line of the letter Z coincides with the center line A-A' of the sensing range of the sensor 111. FIG. 14B shows the output voltages of the sensor 111 appearing when the actual writing position is coincident with the target image forming position As shown, as the portions of the letter Z where the toner is deposited sequentially pass the sensing range of the sensor 111, the output voltage of the sensor 111 drops three times; the interval ($t_1$) between the first and second dips and the interval (t2) between the second and third dips are identical ($t_1=t_2$). FIG. 14C shows the output voltages of the sensor 111 appearing when the sensing range of the sensor 111 is located on a line B-B', FIG. 14A; the interval $t_1$ is greater than the interval $t_2$. Further, FIG. 14D shows the output voltages of the sensor 111 appearing when the sensing range of the sensor 111 is located on a line C-C', FIG. 14A; the interval $t_1$ is smaller than $t_2$. The delay time t is increased or decreased such that the intervals $t_1$ and $t_2$ become equal, whereby the writing position (strictly, the position relative to the sensor 111) is maintained constant.

The target image forming position of the center line of the Z pattern has been shown and described as coinciding with the center line A-A' of the sensing range of the sensor 111. Alternatively, any desired position of the pattern may be brought into coincidence with the center line A-A'. Then, the target ratio between the above-stated intervals $t_1$ and $t_2$ will change.

FIGS. 15A–15D show a third specific pattern image and detection signals associated therewith. Specifically, FIG. 15A shows a pattern whose density changes in the main scanning direction. The center of the write start signal (i.e. delay t from the output of the synchronization sensor 203) is selected such that the target image forming position of particular part A-A' of the pattern image in the lateral direction coincides with the center of the sensing range of the sensor 111. FIG. 15B shows the variation of the output voltage of the sensor 111 occurring when the actual writing position is coincident with the target image forming position; the output voltage drops by a predetermined value Vdip when the portions of the pattern image where the toner is deposited pass the sensing range of the sensor 111. FIG. 15C indicates how the output voltage of the sensor 111 changes when the sensing range of the sensor 111 is located on a line B-B', FIG. 15A, i.e., when the actual writing position is deviated from the target position. Further, FIG. 15D shows the variation of the output of the sensor 111 occurring when the sensing range of the sensor 111 is located on a line C-C', FIG. 15A, i.e., when the actual writing position is also deviated from the target position. In FIGS. 15C and 15D, the voltage increases or decreases relative to the voltage shown in FIG. 15B. The delay time t is increased or decreased such that the dip of the sensor 111 becomes equal to the dip Vdip, thereby maintaining the writing position (strictly, the position relative to the sensor 111) constant.

FIGS. 16A–16D show a fourth specific pattern image and detection signals associated therewith. As shown in FIG. 16A, the pattern image is implemented as parallel bars each having a particular length and extending in a direction perpendicular to the moving direction of the drum 107. The center of the write start signal (i.e. delay time t from the output signal of the synchronization sensor 203) is selected such that the target image forming position of particular part A-A' of the bar pattern in the lateral direction coincides with the center of the sensing range of the sensor 111. FIG. 16B shows the variation of the sensor output occurring when the actual writing position and the target image forming position are coincident; the number of dips appearing when the portions of the bar pattern where the toner is deposited pass the sensor 111 has a constant value N (4 in this case). FIG. 16C shows how the sensor output changes when the sensing range of the sensor 111 is located on a line B-B', FIG. 16A, i.e., when the actual writing position is not coincident with the target position; the number of dips is smaller than the number shown in FIG. 10B. FIG. 16D shows the variation of the sensor output occurring when the sensing range of the sensor 111 is located on a line C-C', FIG. 16A; the number of dips is greater than the number shown in FIG. 16B. The delay time t is increased or decreased such that the number of dips coincides with N, thereby maintaining the writing position constant.

Figure 17A:
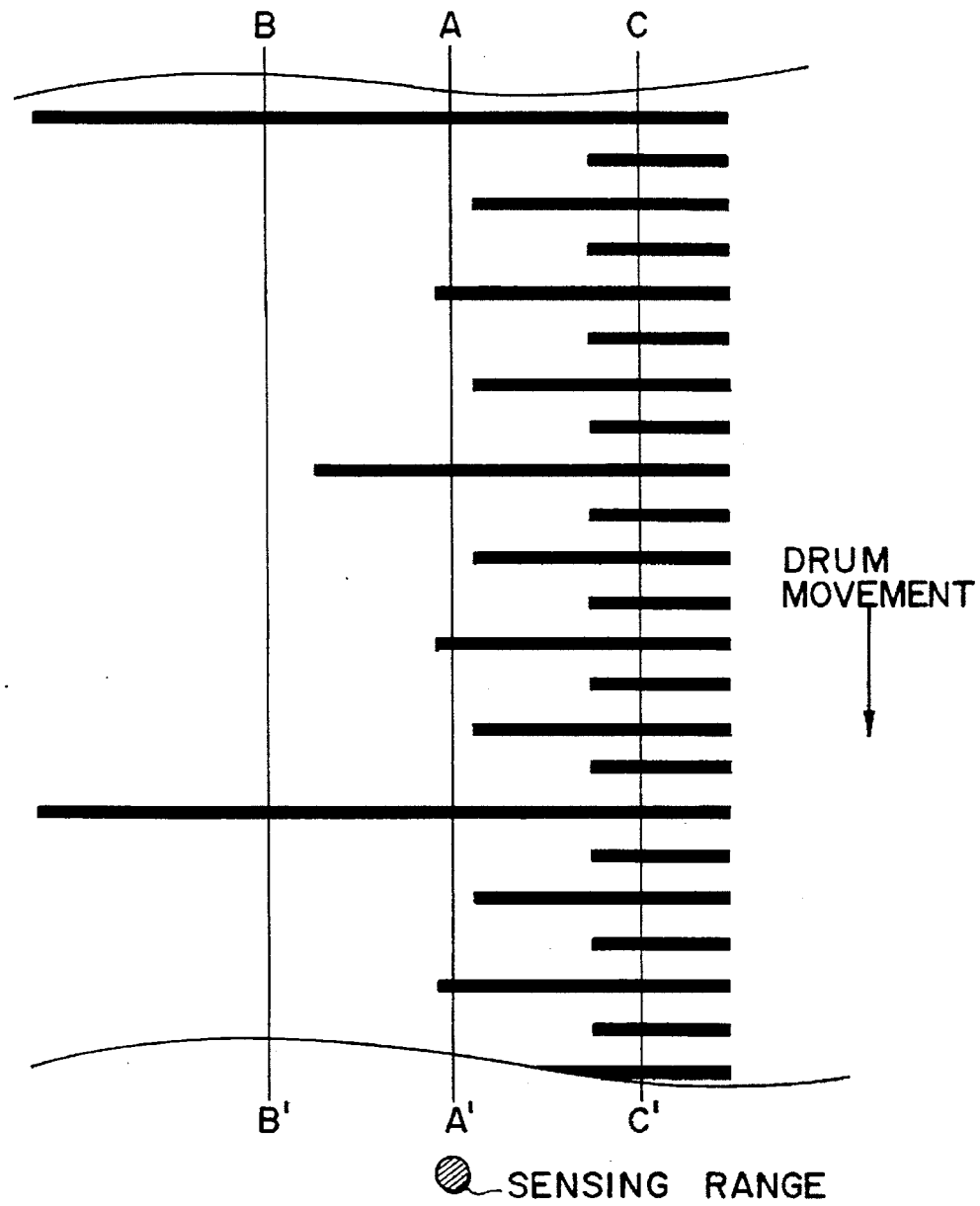
Figures 17B, 17C, 17D:
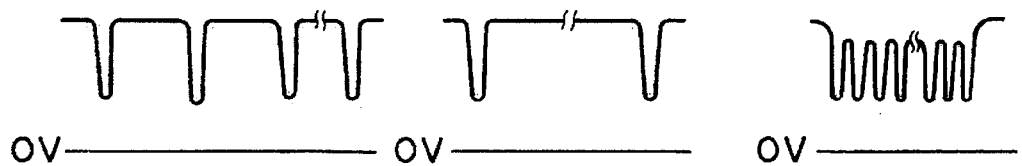

FIGS. 17A–17D show a fifth specific pattern image and detection signals associated therewith. As shown in FIG. 17A, the pattern image is implemented as parallel bars each having a particular length and extending in a direction perpendicular to the moving direction of the drum 107. The center of the write start signal (i.e. delay time t from the output signal of the synchronization sensor 203) is selected such that the target image forming position of particular part A-A' of the bar pattern in the lateral direction coincides with the center of the sensing range of the sensor 111. In this case, when the pattern image passes the sensing range of the sensor 111, a particular value N is obtained as the frequency of the variation of the sensor output. Specifically, FIG. 17B shows the variation of the sensor output occurring when the actual writing position and the target image forming position are coincident; the number of dips appearing when the portions of the bar pattern where the toner is deposited pass the sensor 111 has a constant value N. FIG. 17C shows how the sensor output changes when the sensing range of the sensor 111 is located on a line B-B', FIG. 17A, i.e., when the actual writing position is not coincident with the target position; the number of dips is smaller than the number shown in FIG. 17B. FIG. 17D shows the variation of the sensor output occurring when the sensing range of the sensor 111 is located on a line C-C', FIG. 17A; the number of dips is greater than the number shown in FIG. 17B. The delay time t is increased or decreased such that the frequency of variation of the sensor output occurring when the pattern image passes the sensing range of the sensor 111 coincides with N, thereby maintaining the writing position constant. By detecting the variation of the frequency in the sensor output voltage, it is possible to determine a positional deviation without being effected by the changes in the rotation speed of the drum 107.

Figure 18D:
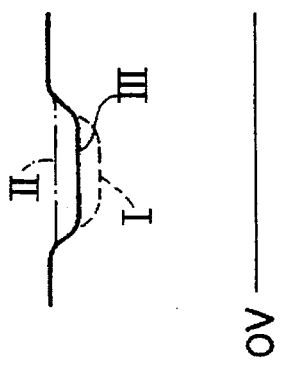
FIGS. 18A–18D show output voltages particular to a regular reflection type pattern sensor applicable to the embodiment.
Figure 18C:
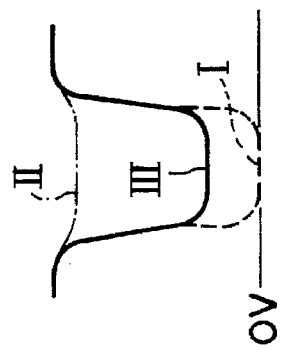
Figure 18B:
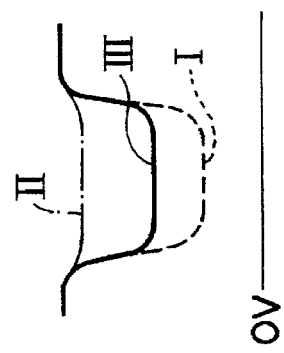
Figure 18A:
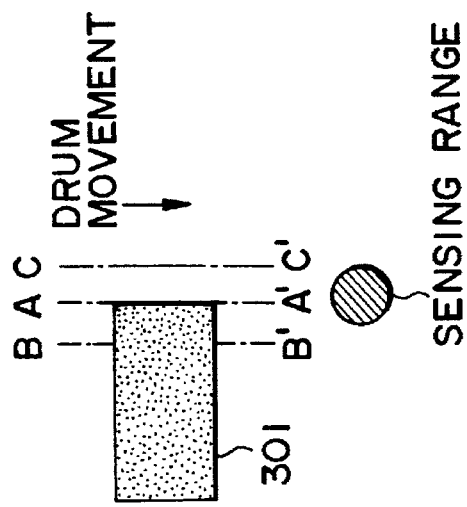

FIGS. 18A–18D use the same pattern as FIGS. 13A–13D. When an ordinary pattern sensor 111 sensitive to both of regular and diffused reflections, as shown in FIG. 11, is used to sense the solid pattern of FIG. 18A formed by a black toner (carbon dispersion type), the output voltage of the sensor 111 changes along a dotted curve I. When the same sensor is used to sense the solid pattern formed by a color toner, the output voltage of the sensor 111 changes along a dash-and-dot curve II. By contrast, when use is made of the sensor having the construction of FIG. 12 for sensing the solid pattern formed by a color toner, the output voltage of the sensor 111 changes along a solid curve III. FIGS. 18B, 18C and 18D are respectively representative of a condition wherein the actual writing position is coincident with the target image forming position (the sensing range of the sensor 111 is located on a line A-A', FIG. 18A), a condition wherein the sensing range of the sensor 111 is located on a line B—B, FIG. 18A, and a condition wherein it is located on a line C-C', FIG. 18A.

Figure 19B:
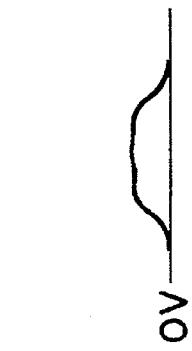
FIGS. 19A–19D show output voltages available with a diffused refleftion type pattern sensor also applicable to the embodiment.
Figure 19C:
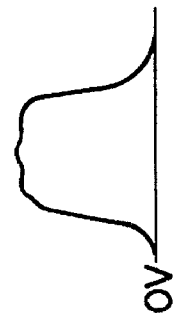
Figure 19D:
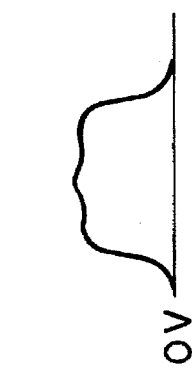
Figure 19A:
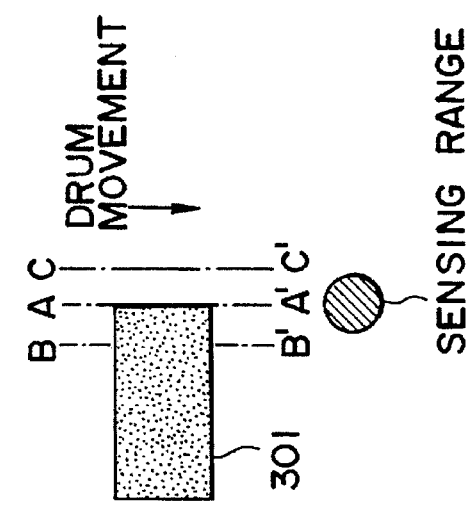

FIGS. 19A–19D illustrate the output voltages of he pattern sensor 111 having the construction shown in FIG. 10. As shown in FIG. 19A, the pattern image is implemented as a solid pattern formed by a color toner, as in FIG. 13A. When the actual writing position is coincident with the target image forming position (the sensing range of the sensor 111 is located on a line A-A', FIG. 19A), the output voltage of the sensor 111 changes as shown in FIG. 19B. When the sensing range of the sensor 111 is located on a line B-B', FIG. 19A, the output voltage changes as shown in FIG. 19C. Further, when the sensing range of the sensor is located on a line C-C', FIG. 19A, the output voltage changes as shown in FIG. 19D. When the light-sensitive element 111b is not located on the optical path along which light emitted from the light emitting element 111a is regularly reflected by the drum 107, as stated above, the sensor 111 is operable with accuracy even when the pattern image is formed by a color toner.

FIGS. 20A–20B illustrate the output voltages of the pattern sensor 111 having the construction shown in FIG. 12. As shown in FIG. 20A, the pattern image is implemented as a solid pattern formed by a color toner, as in FIG. 13A. When the actual writing position is coincident with the target image forming position (the sensing range of the sensor 111 is located on a line A-A', FIG. 20A), the output voltage of the sensor 111 changes as shown in FIG. 20B. When the sensing range of the sensor 111 is located on a line B-B', FIG. 20A, the output voltage changes as shown in FIG. 20C. Further, When the sensing range of the sensor 111 is located on a line C-C', FIG. 20A, the output voltage changes as shown in FIG. 20D. Again, the delay time t is increased or decreased such that the output voltage of the sensor 111 becomes equal to the target voltage, thereby maintaining the writing position (strictly, the position relative to the sensor 111) constant. The transmission type sensor 111 is usable even when the pattern image of FIG. 20A is formed by a black toner.

As stated above, in an image forming apparatus of the type forming an image on a photoconductive element by an electrophotographic process, the embodiment has pattern forming means for forming a particular pattern on the non-image area of the photoconductive element, pattern detecting means for optically reading the pattern image, and adjusting means for adjusting the image writing position on the basis of the output of the pattern detecting means. Therefore, with compact and inexpensive position detecting means, the embodiment can detect an image forming position on the basis of a pattern image formed on a photoconductive element and then adjust it on the basis of the resulting signal, thereby insuring desirable image quality.

2nd Embodiment

Figure 21:
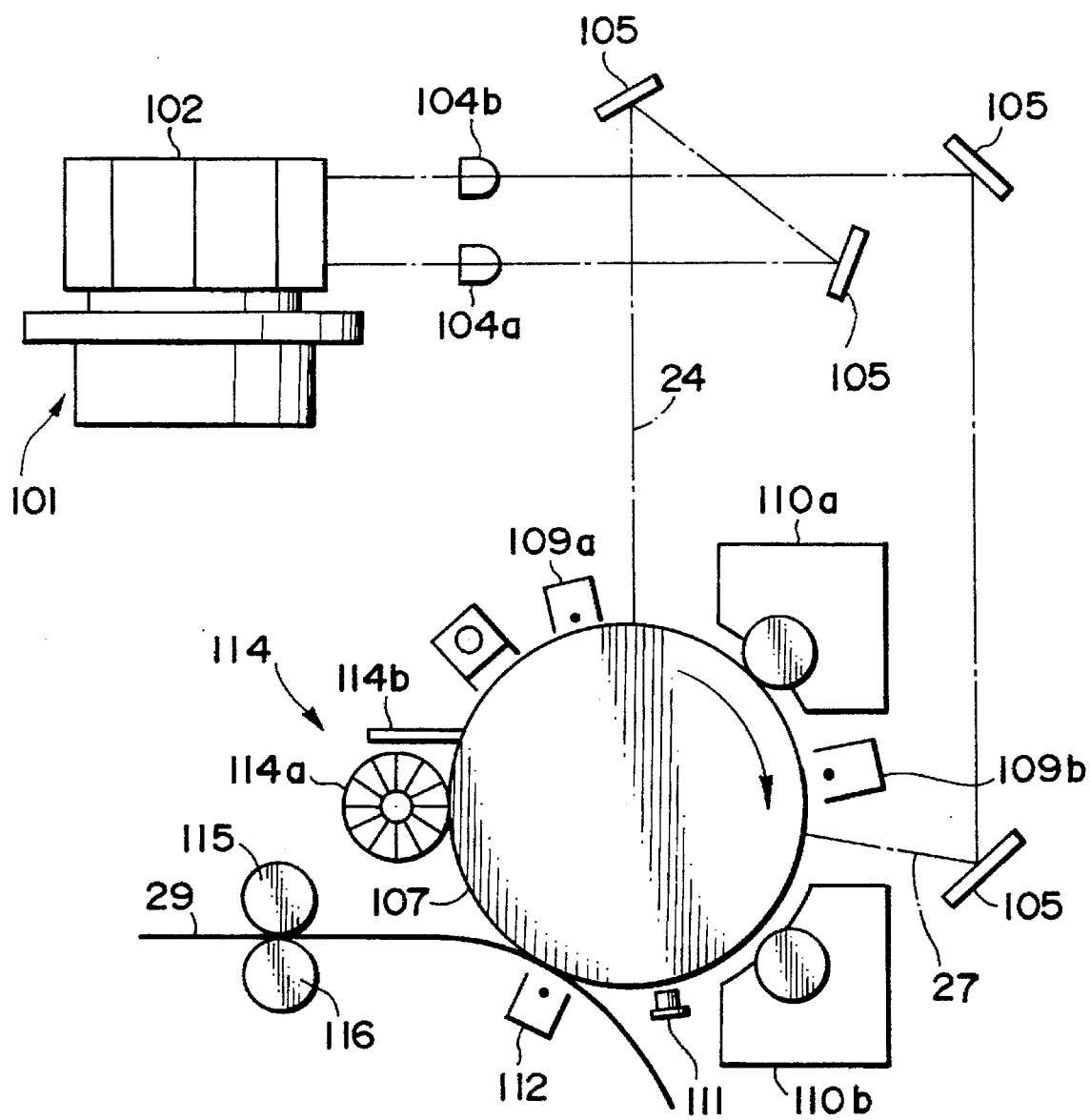
FIG. 21 is a section showing a bicolor laser printer with which a second embodiment of the present invention is practicable.

This embodiment is applied to a bicolor laser printer of the type shown in FIG. 3. Specifically, FIG. 21 shows a bicolor laser printer to which this embodiment is applicable. As shown, the laser printer is essentially similar to the laser printer of FIG. 3 except for the addition of the pattern sensor 111, and a detailed description will not be made to avoid redundancy. In FIG. 21, the reference numerals 24 and 27 designate a laser beam of first color and a laser beam of second color, respectively. Also, the reference numeral 29 designates a paper or similar recording medium. Assume that the first and second colors are black and red, respectively.

Figure 22:
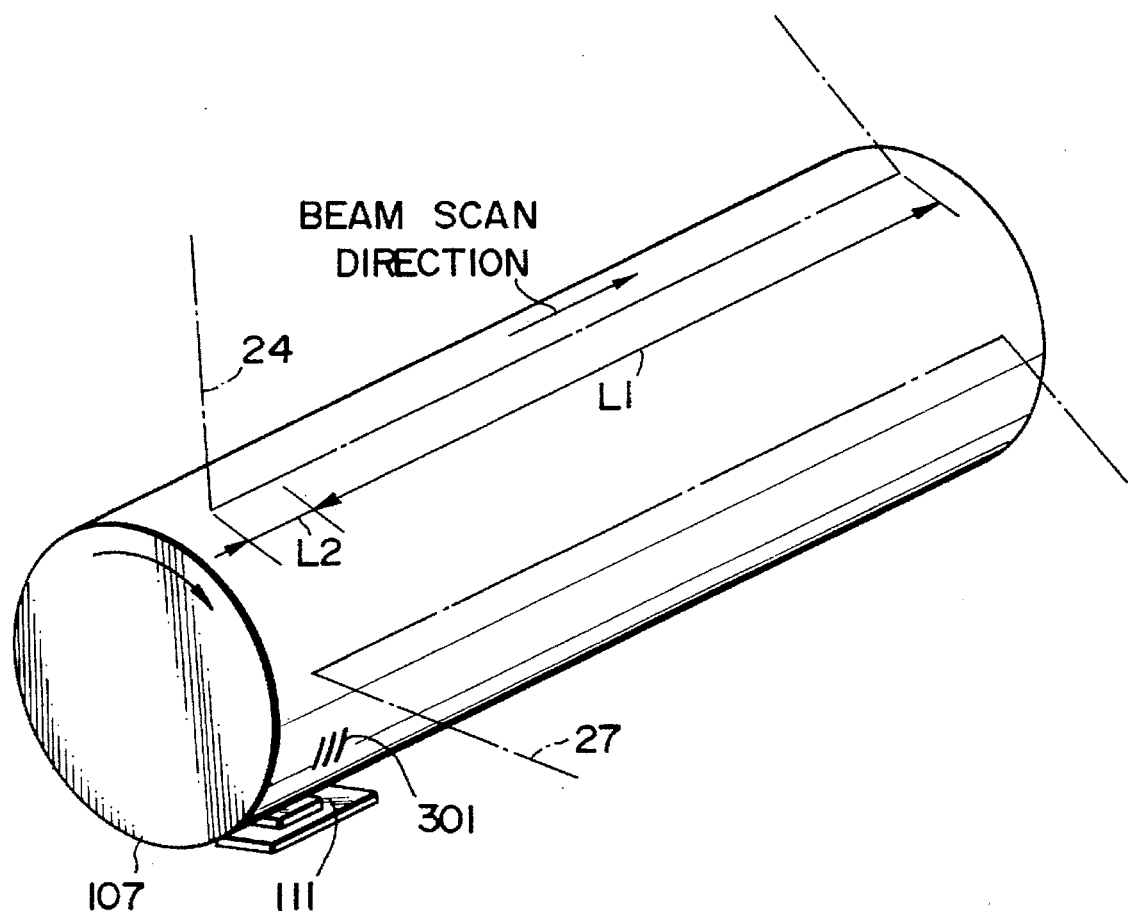
FIG. 22 is a view indicative of a positional relation between a pattern sensor and a photoconductive drum particular to the second embodiment.

FIG. 22 shows the drum 107 and pattern sensor 111 with which the illustrative embodiment is practicable. As shown, the drum 107 has an effective image forming range L1, and a pattern forming range L2 contiguous with the beginning of the range L1 in the main scanning direction. The pattern sensor 111 is located to face and spaced apart from the pattern forming range L2 so as to optically sense the toner image pattern 301 formed in the range L2. If desired, a plurality of pattern sensors 111 may be arranged in the main scanning direction or beam scanning direction, in which case the toner image pattern 301 will be sensed at a plurality of locations.

To form the toner image pattern 301, predetermined bicolor pattern data are stored in a memory, not shown. Specifically, after the drum 107 has been uniformly charged by the main charger 109a, the writing unit 101 illuminates the drum 107 with a laser beam 24 to form a latent image of first color. The developing unit 110a develops this latent image to produce a corresponding toner image pattern of first color. Then, the drum 107 is again uniformly charged by the other main charger 109b and then :illuminated by a laser beam 27 emitted from the writing unit 101. As a result, a pattern of second color is written on the drum 107 over the pattern of first color to form a latent image of second color. The developing unit 110b develops the latent image of second color to produce a corresponding toner image pattern. The toner image patterns of first and second color constitute a composite toner image pattern 301. The toner image pattern 301 is removed by the cleaning unit 114 without being transferred to the paper 29.

In the writing unit 101, two semiconductor lasers are respectively modulated by pattern signals of two colors read out of the memory by a modulation drive circuit, thereby emitting the laser beams 24 and 27. The laser beams 24 and 27 are each steered by the polygonal mirror 102 and then incident on the drum 107 via the f-theta lens 104a or 104b and mirrors 105. The drum 107 is rotated by a motor, not shown, to implement subscanning. The laser beams 24 and 27 scan the drum 107 in the main scanning direction to form latent images of two colors on the drum 107. Also, the laser beams 24 and 27 from the polygonal mirror 102 are each sensed by respective beam sensor via the associated mirrors 105. The pattern signals of two colors are each sent to a modulation drive circuit a predetermined period of time later than the output of the associated beam sensor.

FIG. 23 shows a specific example of the toner image pattern 301 applicable to the illustrative embodiment and used to detect a positional deviation in the main scanning direction. As shown, the pattern 301 is implemented as three line images 301X, 301Y and 301Z each having a width corresponding to three dots in the main scanning direction. The line images 301X–301Z are periodically arranged in the main scanning direction, and the width of each line image in the subscanning direction is greater than the total width (fifteen dots width) of the three line images in the main scanning direction. Specifically, assuming that the writing density of the writing unit 101 is 400 dots per inch (dpi), then a single dot has a width of 0.0635 millimeter, and three dots have a width of 0.1905 millimeter. The pattern 301 has a smaller width than the sensing range of the pattern sensor 111, as measured in a direction parallel to the direction for adjusting the write start position. Also, the sides of the pattern 301 extending in a direction substantially perpendicular to the position adjusting direction are longer than, e.g., three times as long as the sides extending in the direction parallel to the position adjusting direction.

Figure 24:
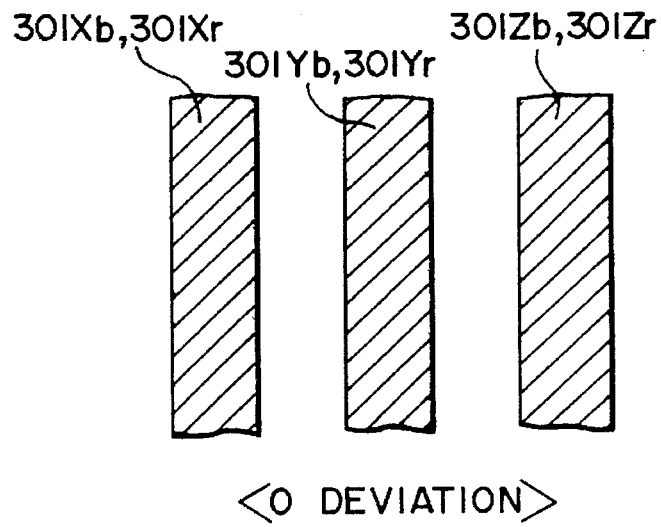
FIG. 24 is a fragmentary plan view of showing the pattern of FIG. 23 in a condition wherein images of different colors are in register.
Figure 25:
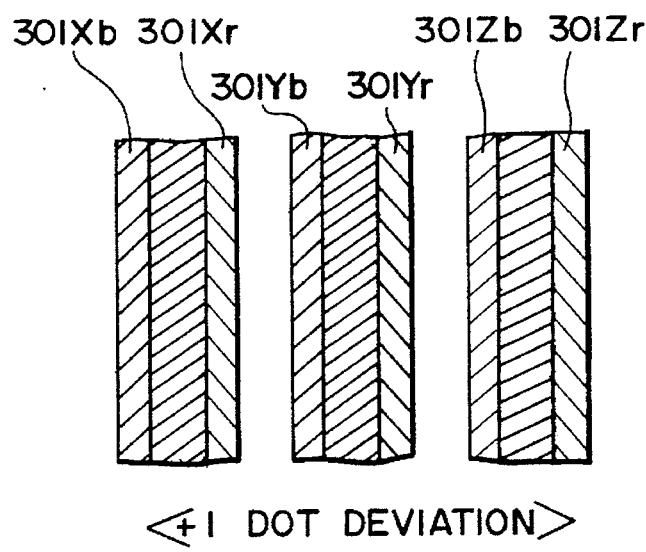
FIGS. 25 and 26 are views similar to FIG. 24, respectively showing the pattern in a condition wherein the images are deviated one dot relative to each other and a condition wherein they are deviated three dots relative to each other.
Figure 26:
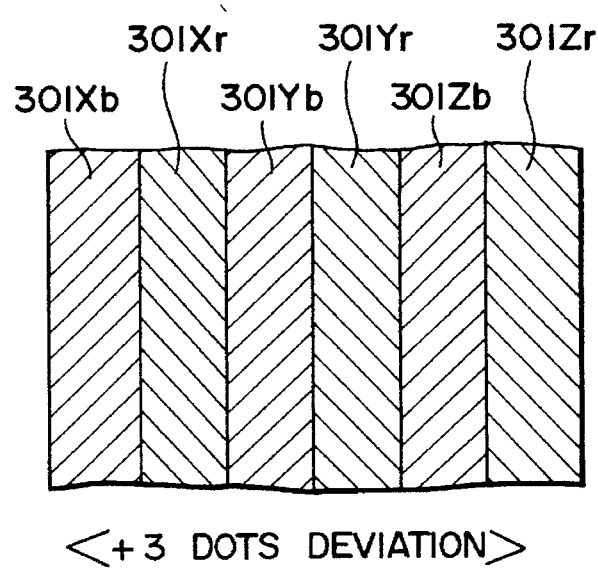

As shown in FIGS. 24–26, the pattern 301 is made up of a black toner pattern 301Xb, 301Yb and 301Zb and a red toner pattern 301Xr, 301Yr and 301Zr which are substantially identical in size and shape. When the two toner patterns 301Xb–301Zb and 301Xr–301Zr are in accurate register, they appear as shown in FIG. 24. When the toner patterns 301Xb–301Zb and 301Xr–301Zr are dislocated one dot in the main scanning direction relative to each other, they appear as shown in FIG. 25. Further, when the toner patterns 301Xb–301Zb and 301Xr–301Zr are deviated three dots in the main scanning direction, they appear as shown in FIG. 26. It is to be noted that the pattern sensor 111 is implemented by the regular reflection type sensor shown in FIG. 9.

Figure 27:
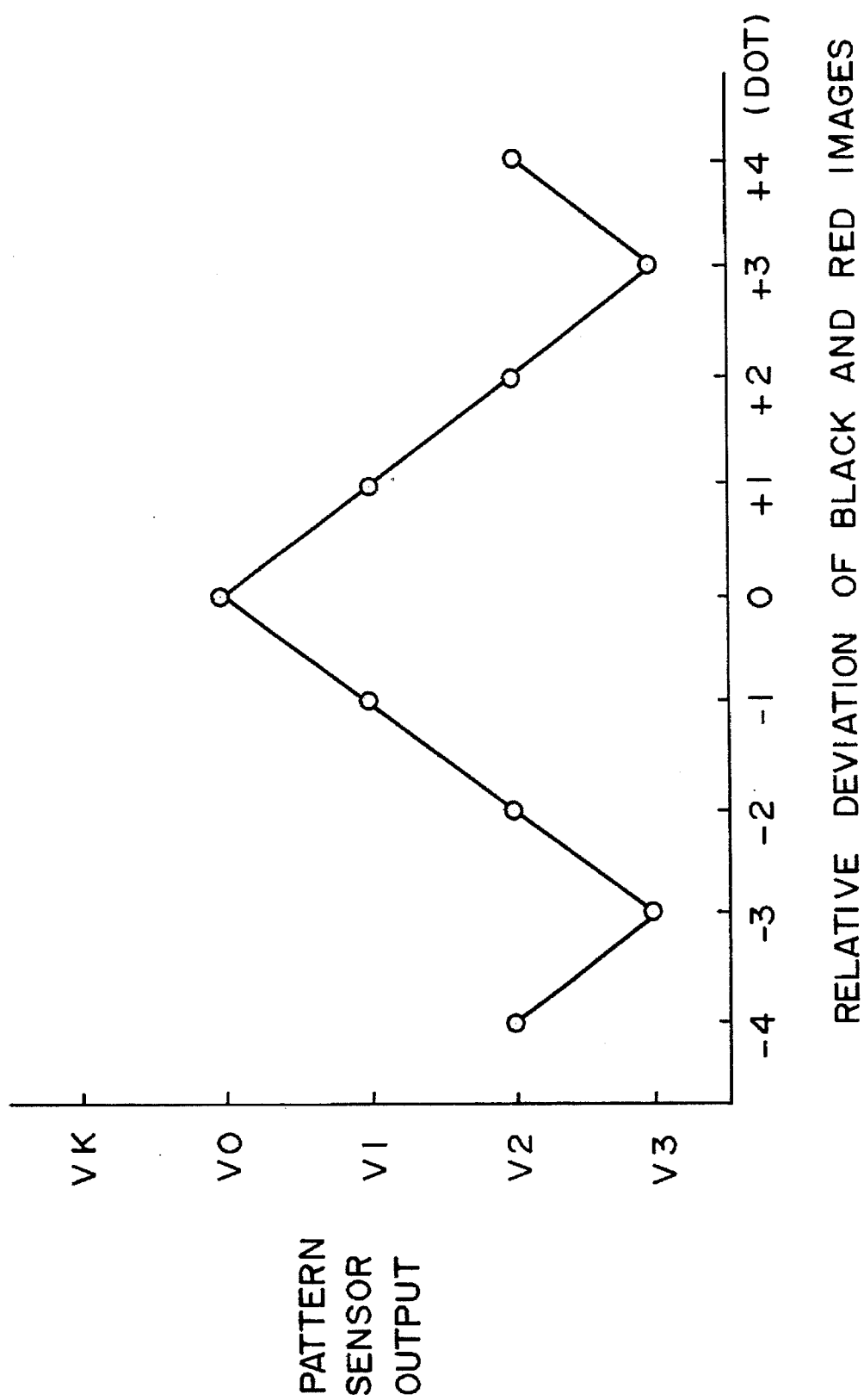
FIG. 27 is a graph representative of a relation between the deviation of the relative position of the images and the output of the pattern sensor.

FIG. 27 is a graph representative of a relation between the deviation of the black and red toner patterns and the output of the pattern sensor 111. As shown, when the deviation of the black and red toner patterns 301Xb–301Zb and 301Xr–301Zr in the main scanning direction is zero, the output of the pattern sensor 111 is V0. As the deviation of the two patterns sequentially increases to one dot, two dots and so forth, the output of the pattern sensor 111 sequentially decreases to V1, V2 and so forth. The output of the pattern sensor 111 again increases when the deviation of the two patterns exceeds three dots.

Therefore, the deviation of the black and red toner patterns 301Xb–301Zb and 301Xr–301Zr in the main scanning direction can be determined in terms of the output of the pattern sensor 111. In the area of the drum 107 where no toner is deposited, the output of the pattern sensor 111 is VK greater than V0. Regarding the pattern sensor 111 responsive to the regular reflection from the drum 107, the sensing range as measured on the drum 107 should be broad enough to cover the possible deviations of the pattern 301. In the illustrative embodiment, the sensing range of the pattern sensor 111 is selected to be greater than 1 millimeter to 2 millimeters in diameter.

How to set an image writing position in the main scanning direction will be described hereinafter.

To maintain the image writing position constant throughout the lines (lines extending in the main scanning direction), the writing unit 101 has a beam sensor, e.g., a PIN photodiode for detecting the arrival of the laser beam 24 or 27 at a predetermined position. This occurs while the laser beam 24 or 27 scans the area of the drum 107 preceding the effective image forming range L1, FIG. 22. The writing unit 101 starts writing an image with the laser beam 24 or 27 on the elapse of a predetermined period of time after the beam sensor has generated a detection signal. As the predetermined period of time is changed, the image writing position and, therefore, the effective image forming range L1 is shifted in the main scanning direction.

Figure 28:
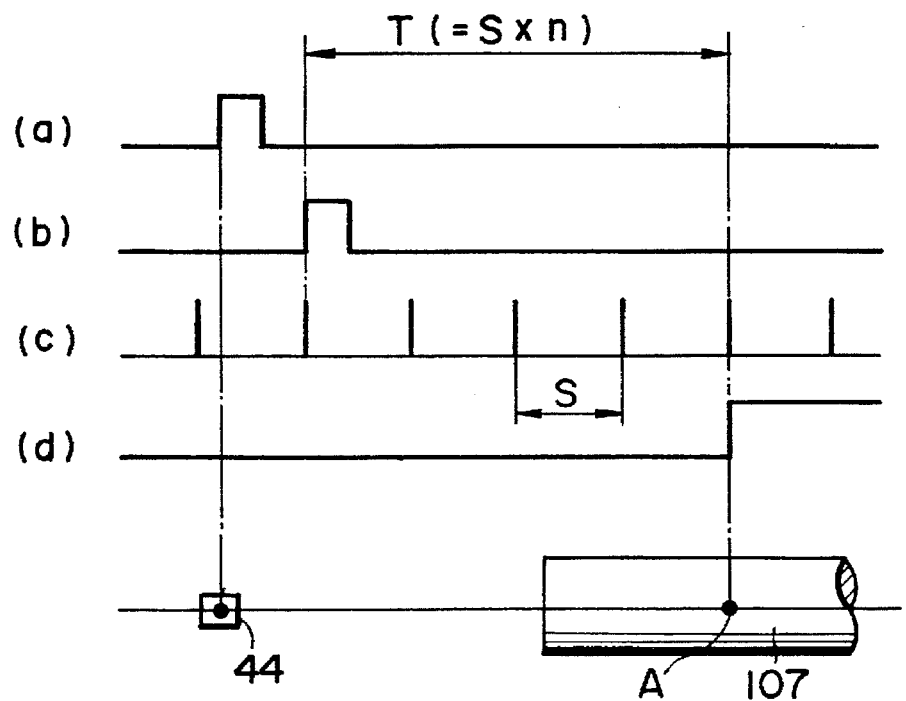
FIG. 28 is a timing chart showing the output of a beam sensor and a timing for starting writing an image.

FIG. 28 shows a relation between the output of the beam sensor and the timing for starting writing an image. As shown, the beam sensor 44 detects the laser beam 24 from the polygonal mirror 102 before the beam 24 starts writing an image, producing an output (a). A write timing setting circuit 45 (see FIG. 30) delays the output (a) of the beam sensor 44 a predetermined period of time t and generates clock pulses (c) synchronous to the resulting delayed signal (b) and having a period S. On counting a predetermined number nb of clock pulses (c) after the generation of the signal (b) (on the elapse of a period of time T), the circuit 45 generates a write timing signal (d). As a result, a black image signal is fed to the modulation drive circuit to modulate the semiconductor laser. Then, the laser beam 24 from the semiconductor laser starts writing a black image on the drum 107 at a point A and sequentially writes it in the main scanning direction.

Likewise, the beam sensor 44 detects the laser beam 27 from the polygonal mirror 102 before the beam 24 starts writing an image. The write timing setting circuit 45 delays the resulting output of the beam sensor 44 the predetermined period of time t and generates clock pulses synchronous to the delayed signal and having a period S. On counting a predetermined number nr of clock pulses after the generation of the delayed signal, the circuit 45 geneates a write timing signal. As a result, a red image signal is fed to the modulation drive circuit to modulate the semiconductor laser. Then, the laser beam 24 from the semiconductor laser starts writing a red image on the drum 107 at the point A and sequentially writes it in the main scanning direction.

The write timing setting circuit 45 corrects the predetermined number nr (or nb) by a correction signal so as to correct the time for generating the write timing signal for the red image (or the black image). As a result, the position on the drum 107 where the red image (or the black image) begins to be written is shifted from the point A in the main scanning direction.

Figure 29:
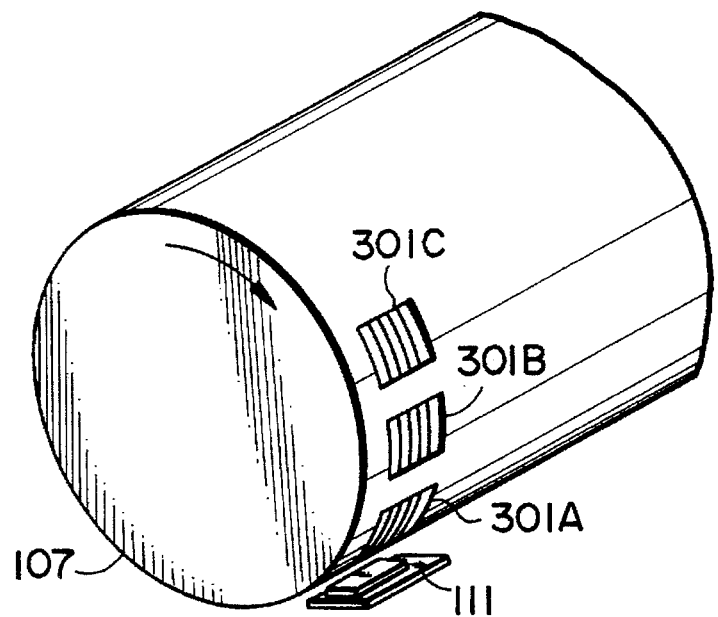
FIG. 29 is a view of a toner image pattern formed on a photoconductive, drum.

The correction of the image writing position will be described specifically. Assume that the positional deviation of the two colors due to aging is less than plus or minus one dot, and that an error signal is generated when the deviation exceeds one dot. As shown in FIG. 29, the toner image pattern 301 is divided into three parts 301A, 301B and 301C spaced apart a predetermined distance in the direction of rotation of the drum 107. The patterns 301A, 301B and 301C each consists of the black pattern 301Xb–301Zb and red pattern 301Xr–301Zr shown in FIGS. 24–26.

While the black pattern 301Xb–301Zb is identical throughout the three patterns 301A–301C, the red pattern 301Xr–301Zr is not the same. Specifically, in the pattern 301B, the red pattern 301Xr–301Zr is located in a non-diviated deviated position such that n shown in FIG. 28 the remains same. In the pattern 301A, the red pattern 301Xr–301Zr is deviated one dot from the non-deviated position in the negative direction such that n is replaced with n−1. Further, in the pattern 301C, the red pattern 301Xr–301Zr is deviated one dot from the non-deviated position in the positive direction such that n+1 holds. As the pattern sensor 111 sequentially senses these patterns 301A–301C, the amount and direction in which the two colors are dislocated relative to each other are determined.

Figure 30:
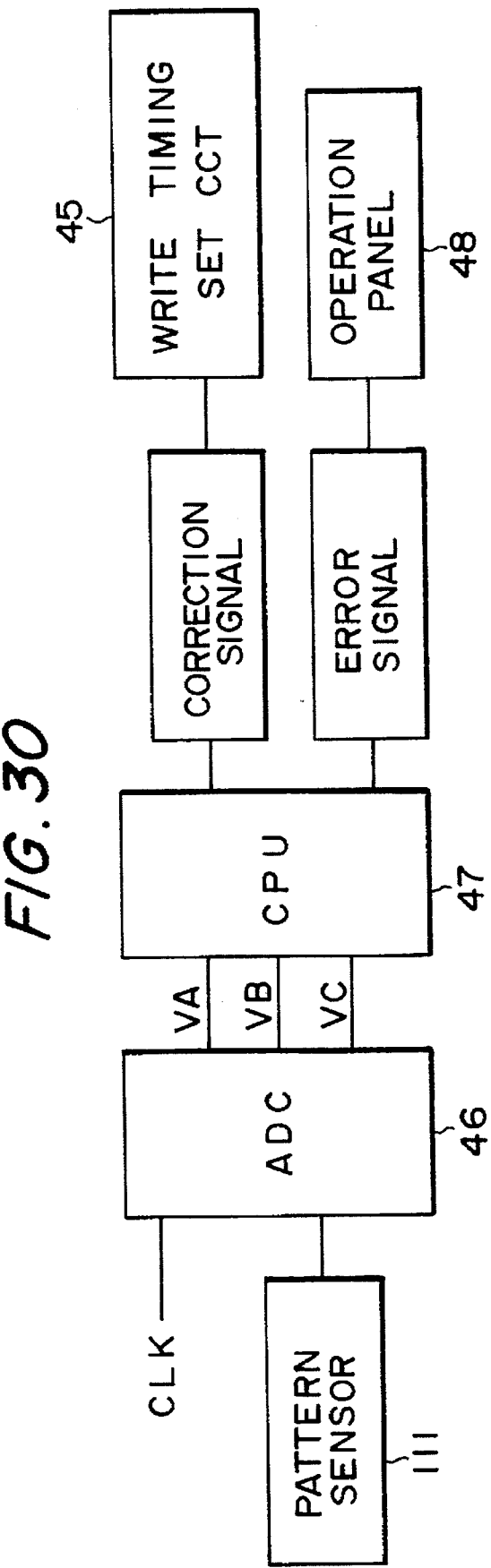
FIG. 30 is a schematic block diagram of circuitry for implementing the second embodiment.
Figure 31:
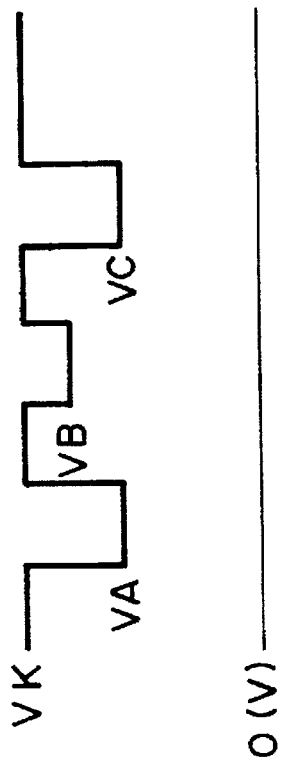
FIG. 31 is a timing chart associated with FIG. 30.

FIG. 30 shows part of specific circuitry for implementing the illustrative embodiment. As shown, an analog-to-digital converter (ADC) 46 transforms the analog output of the pattern sensor 111 to a digital signal and feeds the digital signal to a microcomputer (CPU) 47. Specifically, as shown in FIG. 31, the pattern sensor 111 generates outputs VA, VB and VC representative of the toner image patterns 301A, 301B and 301C, respectively. In response, the CPU 47 determines an amount and a direction in which the two colors are deviated relative to each other. When the amount of deviation lies in a predetermined range (plus or minus one dot), the CPU 47 delivers a correction signal matching it to the write timing setting circuit 45. On receiving the correction signal, the write timing setting circuit 45 corrects the predetermined number nr and, therefore, the time for generating the write timing signal for a red image. As a result, the position for starting writing a red image on the drum 107 is shifted from the point A in the main scanning direction to eliminate the deviation. When the amount of deviation exceeds the predetermined range (plus or minus one dot), the CPU 47 sends an error signal to an operation panel 48 to display an error message. This urges the operator to match the positions of the two colors by hand.

Figure 32:
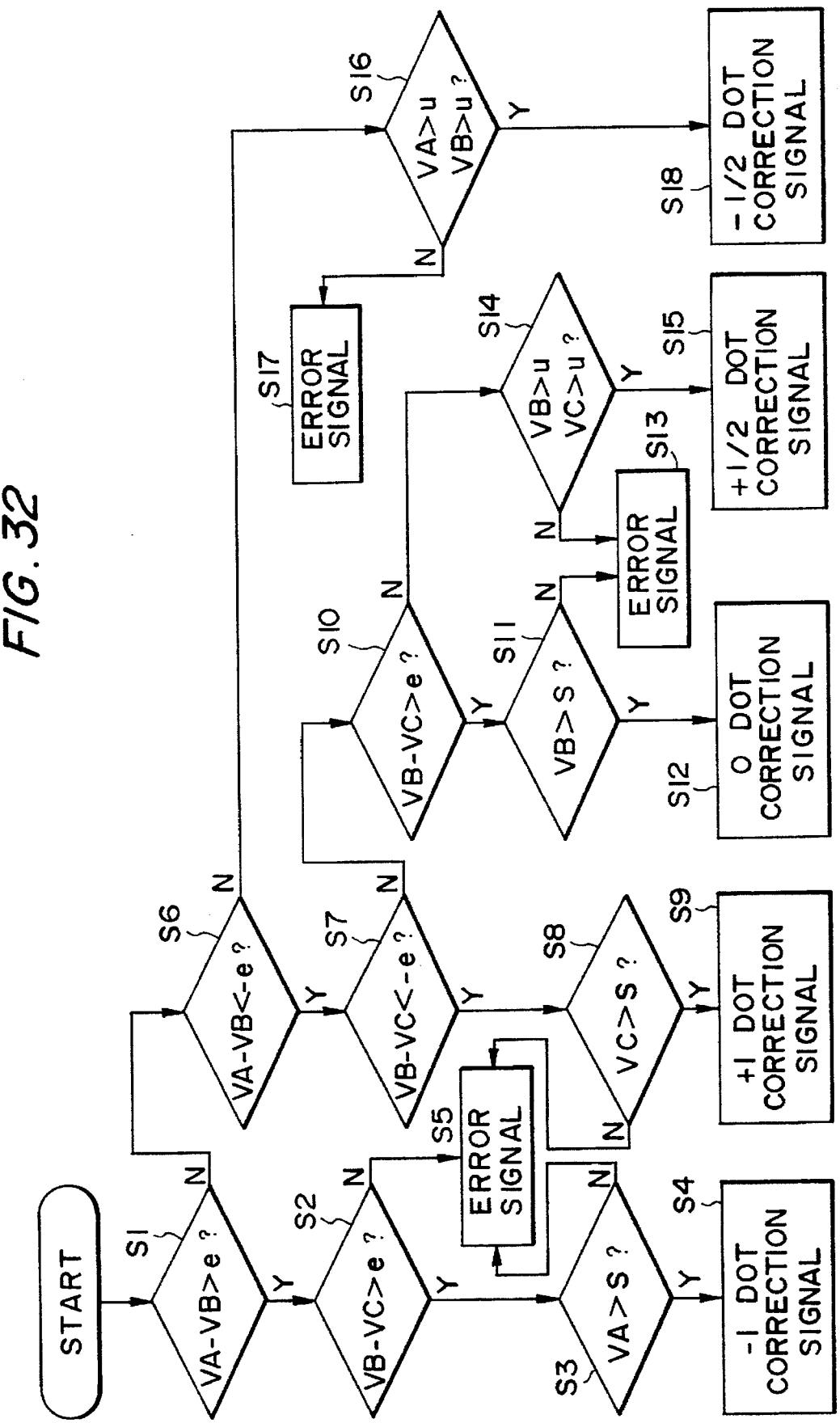
FIG. 32 is a flowchart demonstrating part of a specific procedure to be executed by a CPU included in the circuitry of FIG. 30.

FIG. 32 demonstrates part of a specific procedure to be executed by the CPU 47. As shown, the CPU 47 determines a deviation of the two colors in response to VA, VB and VC and on the basis of constants e, s and u determined beforehand in consideration of irregularities of the output of the pattern sensor 111 and the characteristic of FIG. 27. Specifically, the CPU 47 decides whether or not VA–VB is greater than the constant e (step S1). If the answer of the step S1 is positive, Y, the CPU 47 determines whether or not VB–VC is greater than e (S2). If the result of this decision is positive, the CPU 47 determines whether or not VA is greater than s (S3). If VA is greater than s, meaning that only VA is greater than s (see FIG. 33), the CPU 47 determines that the amount of deviation of the two colors is smallest in the area A where the pattern 301A is positioned. Then, the CPU 47 sends a –1 dot correction signal to the write timing setting circuit 45 (S4). In response, the write timing setting circuit 45 replaces the predetermined number nr with nr+1 so as to shift the time for generating a write timing signal for a red image one dot in the positive direction. As a result, the position for starting writing a red image on the drum 107 is shifted from the point A in the main scanning direction to eliminate the deviation.

If VB–VC is not greater than e as determined in the step S2, the CPU 47 sends an error signal to the operation panel 48 (S5). Then, an error message appears on the operation panel 48 to urge the operator to match the positions of the two colors by hand. This is also true when the VA is not greater than s as determined in the step S3.

When VA–VB is not greater than e as determined in the step S1, the CPU 47 determines whether or not VA–VB is smaller than –e (S6). If VA-VB is smaller than –e, the CPU 47 determines whether or not VB–VC is smaller than –e (S7). If the answer of the step S7 is positive, the CPU 47 determines whether or not VC is greater than s (S8). If the answer of the step S8 is positive, meaning that only VC is greater than s (see FIG. 34), the CPU 47 determines that the amount of deviation is smallest in the area C where the pattern 301C is positioned. Then, the CPU 47 sends a +1 dot correction signal to the write timing setting circuit 45. In response, the write timing setting circuit 45 corrects the predetermined number nr to shift the time for generating a write timing signal for a red image one dot in the negative direction. As a result, the position for starting writing a red image on the drum 107 is shifted from the point A in the main scanning direction to eliminate the deviation.

When VC is not greater than s, the CPU 47 also executes the step S5 to send an error signal to the operation panel 48, urging the operator to perform manual adjustment. If VB–VC is not smaller than –e as determined in the step S7, the CPU 47 determines whether or not VB–VC is greater than e (S10). If the answer of the step S10 is positive, the CPU 47 determines whether or not VS is greater than s (S11). If VB is greater than s, meaning that only VB is greater than s (see FIG. 35), the CPU 47 determines that the amount of deviation is smallest in the area B where the pattern 301B is formed and, therefore, maintains a 0 dot correction signal (S12). Therefore, the write timing setting circuit 45 does not correct the predetermined number nr, i.e., the time for generating a timing signal for a red image. When VB is not greater than s as determined in the step S11, the CPU 47 also executes a step S13 for sending an error signal to the operation panel 48, urging the operator to perform manual adjustment.

Figure 36:
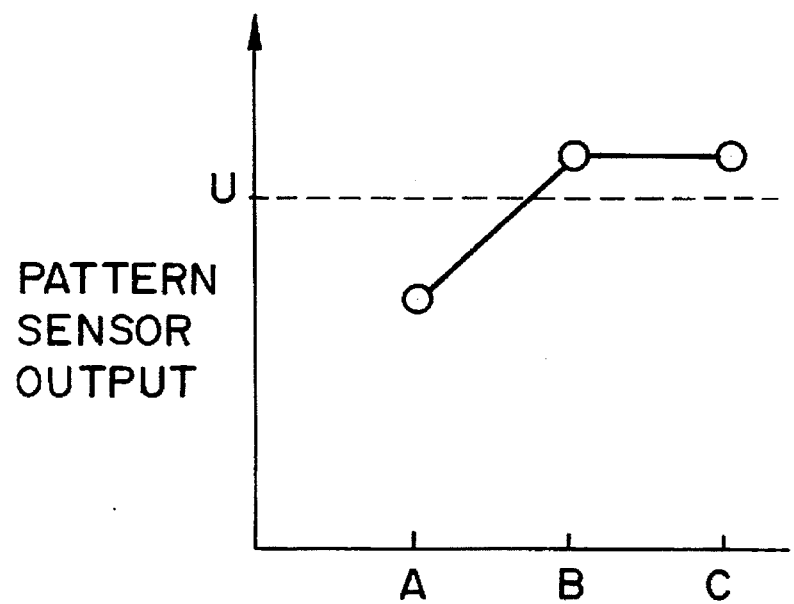

When VB–VC is not greater than e as determined in the step S10, the CPU 47 determines whether or not both of VB and VC are greater than u (S14). If the answer of the step S14 is positive, meaning that only VB and VC are greater than u (see FIG. 36), the CPU 47 determines that the amount of deviation is smallest at the intermediate between the areas B and C where the patterns 301B and 301C respectively are formed. Then, the CPU 47 sends a +½ dot correction signal to the write timing setting circuit 45 (S12). In response, the write timing setting circuit 45 shifts the time for generating a write timing signal for a red image half a dot in the negative direction. As a result, the position for writing a red image on the drum 107 is shifted from the point A in the main scanning direction to eliminate the deviation.

Figure 37:
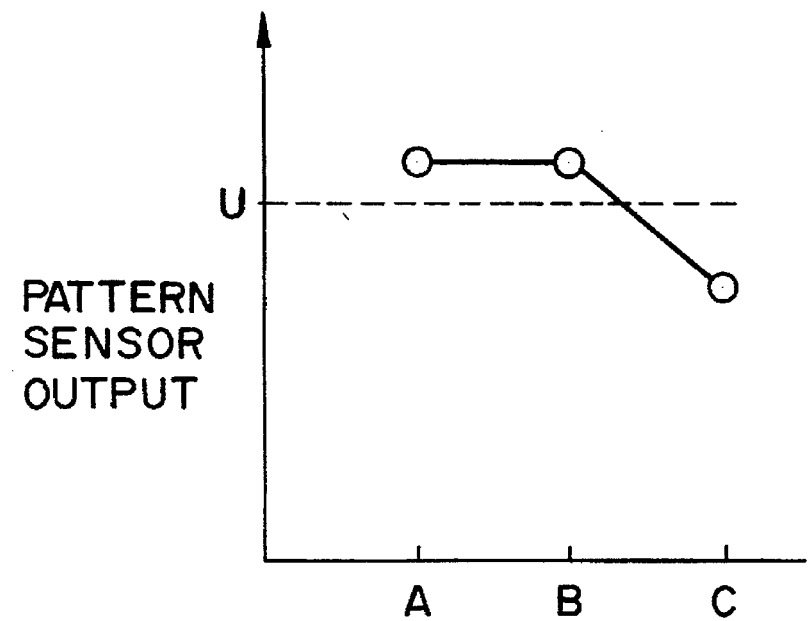

When both of VB and VC are not greater than u, the CPU 47 sends an error signal to the operation panel 48 to display an error message. This also urges the operator to adjust the positions of the two colors by hand. If VA–VB is not smaller than –e as determined in the step S6, the CPU 47 determines whether or not both of VA and VB is greater than u (step S16). If the answer of the step S16 is positive, meaning that only VA and VB are greater than u (see FIG. 37), the CPU 47 determines that the amount of deviation is smallest at the intermediate between the areas A and B where the patterns 31A and 31B respectively are formed. Then, the CPU 47 sends a –½ dot correction signal to the write timing setting circuit 45 (S12). In response the write timing setting circuit 45 shifts the time for generating a write timing signal for a red image half a dot in the positive direction. As a result, the position for writing a red image on the drum 107 is shifted from the point A in the main scanning direction to eliminate the deviation. Further, if both of VA and VB are not greater than u, the CPU 47 sends an error signal to the operation panel 48 (S17). As a result, an error message appears on the operation panel 48 to urge the operator to adjust the positions of the two colors by hand.

As stated above, in the illustrative embodiment, the pattern sensor 111 illuminates the toner pattern image 301 and receives only regular reflection, as distinguished from diffused reflection. The position for writing an image is adjusted on the basis of the resulting output of the pattern sensor 111. Hence, the regular reflection incident on the pattern sensor 111 is maximum when the black pattern 301X*b*–301Z*b* and red pattern 301X*r*–301Z*r* are not deviated at all. The deviation of the two patterns 301X*b*–301Z*b* and 301X*r*–301Z*r* can be so adjusted as to maximize the regular reflection to be incident on the pattern sensor 111, thereby reducing color deviation. In addition, this can be done without resorting to a CCD (Charge Coupled Device) array and, therefore, with a compact and inexpensive arrangement.

Generally, a toner image formed on a photoconductive drum is different in size from a corresponding latent image electrostatically formed on the drum. By contrast, the black toner pattern 301X*b*–301Z*b* and red toner pattern 301X*r*–301Z*r* actually formed on the drum 107 are substantially identical in size and shape, promoting accurate detection of a deviation. Further, since regular reflection from a photoconductive drum is generally greater in quantity than diffused reflection, the signal-to-noise (S/N) ratio is increased. Moreover, in the illustrative embodiment, the toner image pattern 301 has a greater dimension in the direction substantially perpendicular to the direction for adjusting the write start position than in the direction parallel to the write start position, e.g., three times longer in the former than in the latter. Therefore, the detection of a deviation is not effected by the deviation of the pattern 301 which may occur in the direction perpendicular to the direction of adjustment.

The toner image pattern 301 is implemented as three line images 301X, 301Y and 301Z each extending over three dots in the main scanning direction parallel to the direction of adjustment, as stated earlier. The line images 301X–301Z are periodically arranged in the main scanning direction at intervals of three dots. In the direction parallel to the direction of adjustment, the pattern 301 is smaller in dimension than the sensing range of the pattern sensor 111. Hence, when the amount of deviation δ is small, the output of the pattern sensor 111 changes by D which is expressed as:

$$D = \delta \cdot L$$

where L is the sum of length components in the direction perpendicular to the direction in which the edge portions of the pattern 301 are deviated within the sensing range of the pattern sensor 111. It follows that the sensitivity can be increased by reducing the size of the pattern 301. In addition, since the bicolor pattern 301 includes a black pattern, the sensitivity of the pattern sensor 111 is high.

While the embodiment is implemented with the pattern sensor 111 shown in FIG. 8, it may be implemented with the pattern sensor 111 shown in FIG. 10. Then, since the pattern sensor 111 receives diffused reflection from the drum 107, the diffused reflection becomes maximum when the black pattern 301X*b*–301Z*b* and red pattern 301X*r*–301Z*r* are not deviated at all. The deviation of the two patterns can be so adjusted as to maximize the diffused reflection, thereby reducing color deviation. In addition, this can be done without resorting to a CCD array and, therefore, with a compact and inexpensive arrangement.

Also, use may be made of the pattern sensor 111 shown in FIG. 11 and which receives total reflection from the drum 107. In this case, the regular reflection becomes maximum and diffused reflection becomes minimum when the black pattern 301X*b*–301Z*b* and red pattern 301X*r*–301Z*r* are not deviated at all. A deviation can be eliminated on the basis of the output of the pattern sensor 111 so as to reduce color deviation. Moreover, since the pattern sensor 111 receives total reflection, it can be designed and mounted with ease. In addition, this can be done without resorting to a CCD array and, therefore, with a compact and inexpensive arrangement. Although the pattern sensor 111 responsive to both of regular and diffused reflections is slightly lower in sensitivity than the others, it rarely occurs that a deviation cannot be detected since regular reflection is greater in amount than diffused reflection.

The pattern sensor 111 shown in FIG. 11 may also be used. This pattern sensor is of the same type as the pattern sensor of FIG. 11 and, therefore, also achieves the various advantages described above.

The pattern sensor 111 shown in FIG. 12 receives non-diffused light transmitted through the transport belt 113. The transmitted non-diffused light becomes minimum when the two toner patterns 301X*r*–301Z*r* and 301X*b*–301Z*b* are not deviated at all. The deviation of the two toner patterns can be so adjusted as to minimize such light, thereby reducing the color deviation. In addition, this can be done without resorting to a CCD array and, therefore, with a compact and inexpensive arrangement.

Figure 38:
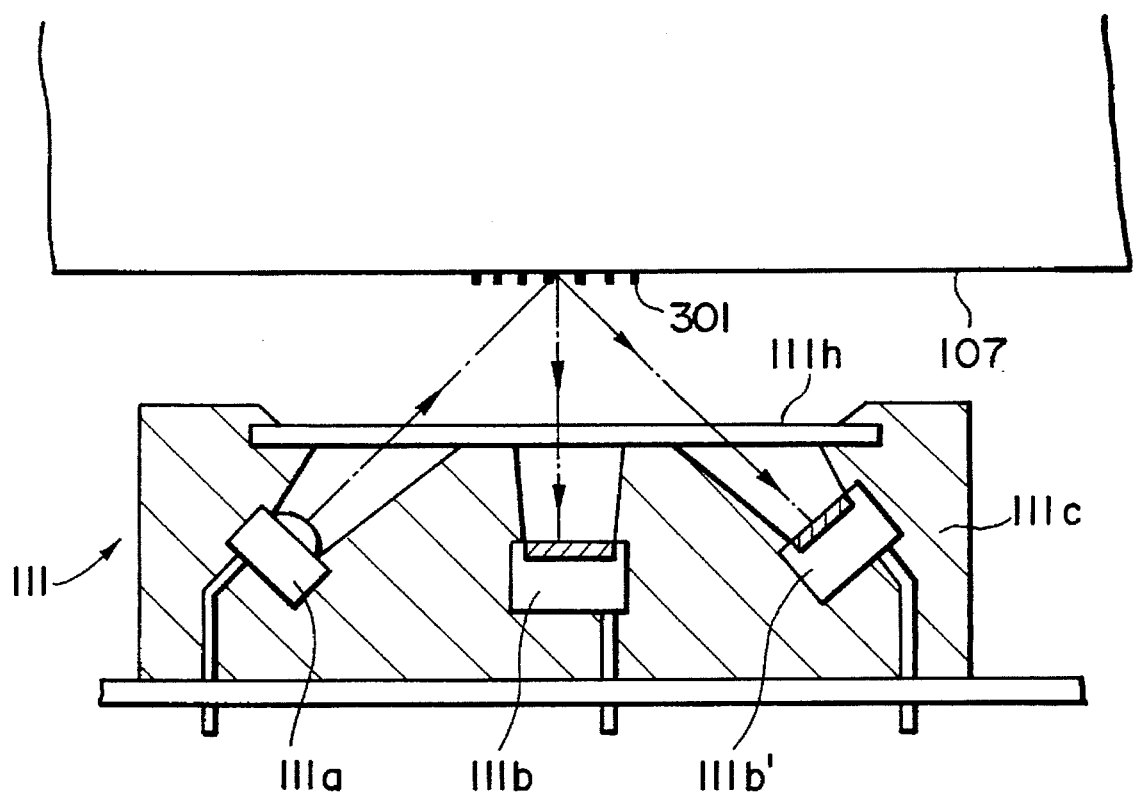
FIG. 38 is a section showing a specific construction of a pattern sensor applicable the second embodiment.

FIG. 38 shows another pattern sensor 111 applicable to the embodiment. As shown, a light-sensitive element 111*b*' is received in the support member 111*c* together with the light emitting element 111*a* and light-sensitive element 111*b*. Optical paths are formed in the support member 111*c*. A cover glass 111*h* is fitted on the front of the support member 111*c* that faces the drum 107. As the light emitting element 111*a* emits light obliquely to the toner image pattern 301 on the drum 107, the resulting regular reflection and diffused reflection are incident on the light-sensitive elements 111*b* and 111*b*', respectively. The outputs of the light-sensitive elements 111*b* and 111*b*' are applied to a differential circuit, not shown, and then to the ADC 46. In this configuration, the pattern sensor 111 receives both the regular reflection and the diffused reflection from the drum 107. Hence, the regular reflection and diffused reflection incident on the sensor 111 respectively become maximum and minimum and, therefore, their difference becomes maximum when the two toner patterns 301X*b*–301Z*b* and 301X*r*–301Z*r* are not deviated at all. The deviation of the two toner patterns can be so adjusted as to maximize the difference, thereby reducing color deviation. In addition, a high S/N ratio is achievable, and a compact and inexpensive construction can be implemented due to the absence of a CCD array.

Figure 39A:
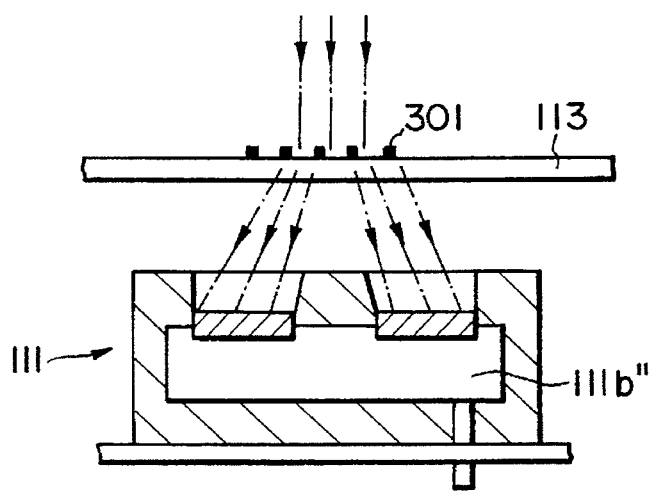
FIGS. 39A and 39B are sections each showing another specific construction of the pattern sensor applicable to the second embodiment.
Figure 39B:
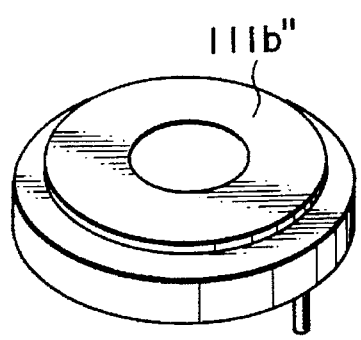

FIGS. 39A and 39B show another pattern sensor 111 applicable to the embodiment. As shown, the pattern sensor 111 is essentially similar to the pattern sensor 111 of FIG. 12 except that it includes an annular light-sensitive element 111*b*" having a broad light receiving area in place of the light receiving element 111*b*. As the light emitting element 111*a* illuminates the toner image pattern 301 on the transport belt 113, the resulting diffused light is incident on the light-sensitive element 111*b*" via the belt 113. With this configuration, the pattern sensor 111 receives diffused light transmitted through the belt 113. Hence, the transmitted diffused light becomes maximum when the two toner patterns 301X*b*–301Z*b* and 301X*r*–301Z*r* are not deviated at all. The deviation of the two toner patterns can be so adjusted as to maximize the transmitted diffused light, thereby reducing color deviation. In addition, a compact and inexpensive construction can be implemented due to the absence of a CCD array.

Figure 40:
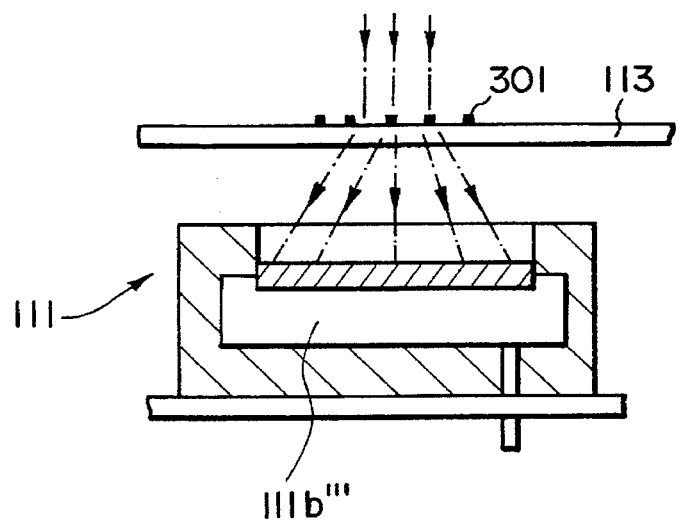
FIG. 40 is a section showing still another specific construction of the pattern sensor.
Figure 41A:
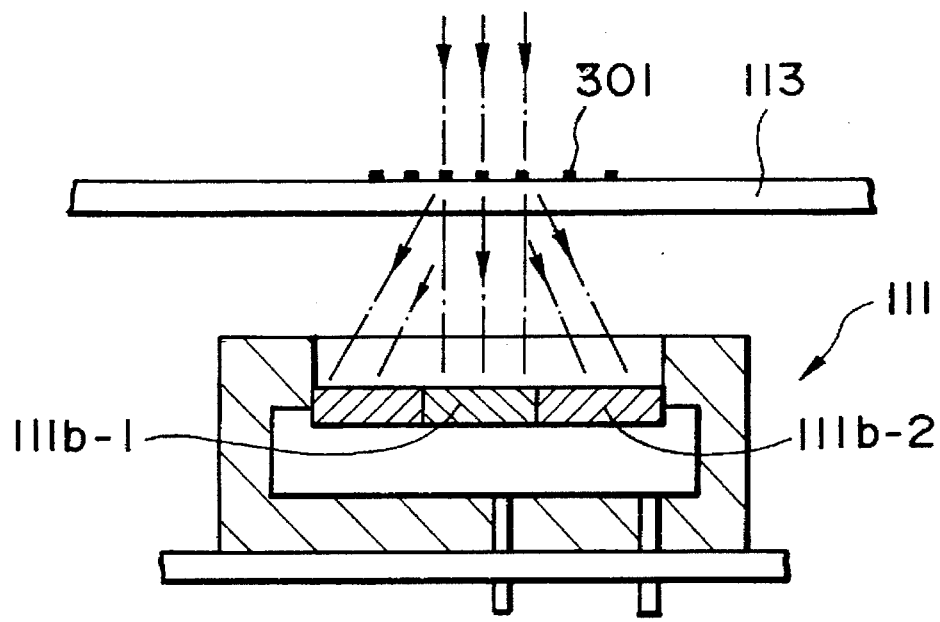
FIGS. 41A and 41B are sections showing a further specific construction of the pattern sensor.
Figure 41B:
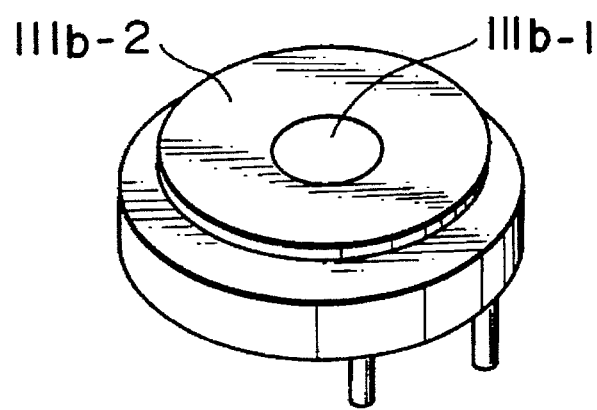

FIG. 40 shows another pattern sensor 111 applicable to the embodiment. As shown, this pattern sensor 111 is also similar to the pattern sensor 111 of FIG. 12 except for the replacement of the light-sensitive element 111*b* with a light-sensitive element 111*b*''' having a broad light receiving area. As the light emitting element 111*a* illuminates the toner image 301 on the drum 107 via a cover glass 111*g*, the resulting diffused light and non-diffused light, i.e., total light is incident on the light-sensitive element 111*b*''' via the transport belt 113. In this configuration, the non-diffused light and diffused light transmitted through the belt 113 become maximum and minimum, respectively, when the two toner patterns 301X*b*–301Z*b* and 301X*r*–301Z*r* are not deviated at all. The deviation of the two toner patterns can be adjusted on the basis of the output of the pattern sensor 111 so as to reduce color deviation. Further, since the pattern sensor 111 receives the total transmitted light, it rarely occurs that the detection of a deviation fails. In addition, the pattern sensor 111 is easy to design and mount and has a compact and inexpensive construction due to the absence of a CCD array.

Figure 42:
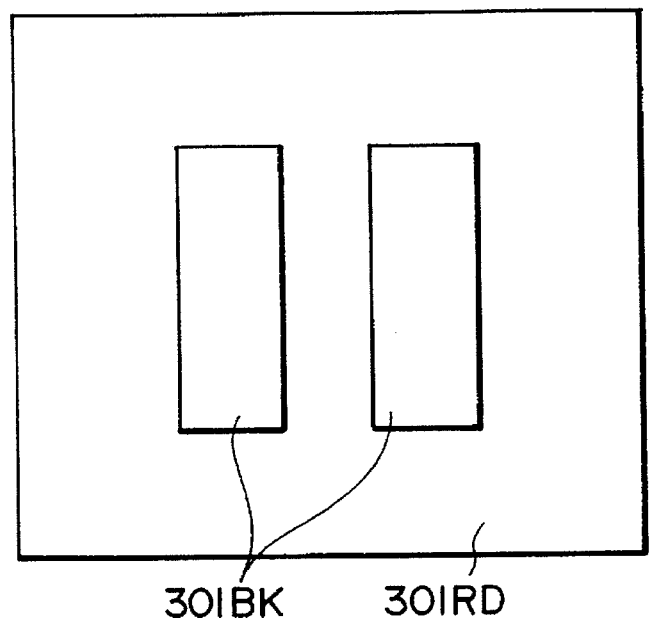
FIGS. 42 and 43 are plan views each showing another specific toner image pattern applicable to the embodiment.
Figure 43:
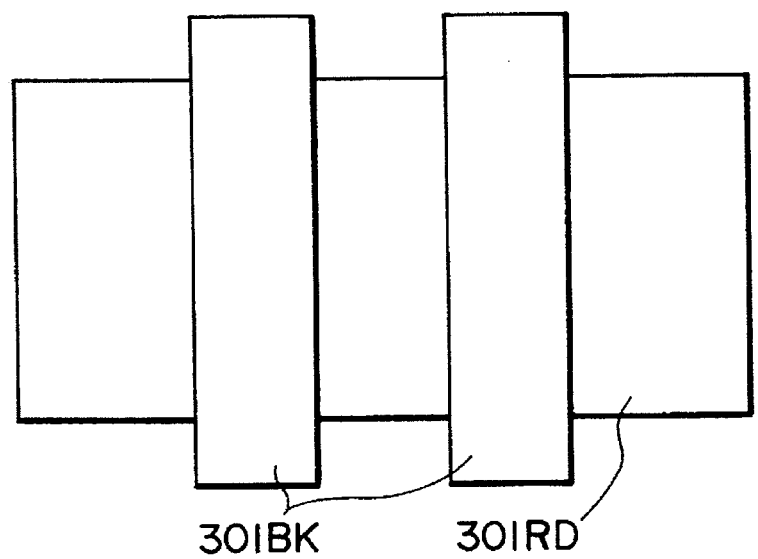

FIG. 42 shows another specific toner pattern 301 with which the embodiment is practicable. As shown, the toner pattern 301 is made up of a black toner pattern 301BK and a red toner pattern 301RD which are complementary in shape to each other, i.e., which do not overlap each other. In this case, the CPU 47 controls the write start position such that the toner patterns 301BK and 301RD do not overlap each other. Generally, a toner image formed on a photoconductive drum is different in size from a corresponding latent image electrostatically formed on the drum. By contrast, the black and red toner patterns actually formed on the drum 107 are substantially identical in size and shape, promoting accurate detection of a deviation. Further, since regular reflection from a photoconductive drum is generally greater in quantity than diffused reflection, the S/N ratio is increased.

In the illustrative embodiment, the deviation due to aging is assumed to be less than plus or minus one dot, and the toner image pattern is implemented as line images having a width of three dots and spaced apart three dots from each other. However, the same S/N characteristic is achievable even when the shape of the toner image pattern is changed in matching relation to the deviation ascribable to aging. For example, when the deviation due to aging is great, the line width and line interval of the pattern may be increased; when it is small, the line width and line interval may be decreased. Deviations in the subscanning direction can also be corrected by the above-described procedure if the direction in which the lines of the pattern extend is used as a main scanning direction.

Further, in the illustrative embodiment, the area where the toner is to deposit is minimized when two toner patterns of different colors and joining each other match in relative position. Alternatively, one of the two toner patterns may be formed in an area where the other toner pattern is not formed, in which case the amount of toner deposition will be maximized when they match in relative position. Further, to increase the sensitivity of the pattern sensor, the toner image pattern may be sensed a plurality of times by the sensor so as to average the results.

The embodiment is also applicable to a full color image forming apparatus of the type forming three or more latent images of different colors on a photoconductive drum, developing them by toners of three or more different colors, and then transferring the resulting toner images to a paper or a transport belt. In this case, the procedure for correcting the relative writing position of two colors described above will be sequentially executed with each writing position so as to automatically adjust the writing positions of all of the colors. The toners of different colors will be evenly consumed only if the toner image patterns of different colors are formed substantially the same number of times. In addition, assuming that one of the toner image patterns is black, the sensitivity of the pattern sensor will be enhanced since the reflectance of the black toner is lower than the others.

In the event of sequentially adjusting the relative writing position two colors at a time as stated above, one of the two colors should preferably be of a fixed color at all times so as to prevent errors from accumulating. If the fixed color is black, the sensitivity of the pattern sensor will be increased to eliminate the accumulation of errors. Further, the black toner image pattern may be superposed on the other toner image pattern to provide the reflection type pattern sensor with higher sensitivity. Conversely, the toner image pattern of another color may be superposed on the black toner image pattern to provide the transmission type pattern sensor with higher sensitivity.

The dimension of the toner image pattern in the direction for adjusting the writing position may be changed in matching relation to the sensed deviation. Specifically, the sensitivity to a deviation is acceptable when the toner image pattern is two to twenty times as long as the deviation and is desirable when the former is four to eight times as long as the latter. However, since a deviation cannot be known beforehand, the dimension of the pattern in the direction of adjustment may be changed on the basis of the deviation to implement optimal detection.

As stated above, the illustrative embodiment is capable of adjusting the deviation of toner image patterns and, therefore, reducing color deviation in response to the output of the pattern sensor. Since the pattern sensor receives total reflection, it rarely occurs that the detection of a deviation fails. Moreover, the pattern sensor is easy to design and mount, and the configuration is compact and inexpensive since it does not use a CCD array.

Various modifications will become possible for those skilled in the art after receiving the teachings of the present disclosure without departing from the scope thereof.

What is claimed is:

1. A device for correcting a position for writing an image on a photoconductive element included in an image forming apparatus, said device comprising:

pattern forming means for forming a predetermined pattern image in a non-image area of the photoconductive element;

pattern sensing means for optically reading said pattern image; and writing position adjusting means for adjusting an image writing position in response to an output signal of said pattern sensing means representative of said pattern image, wherein said pattern image comprises a rectangular pattern longer in a main scanning direction than in a subscanning direction, an image write signal being controlled such that a target image forming position of one edge of said rectangular pattern extending in a vertical direction coincides with a center of a sensing range of said pattern sensing means.

2. A device claimed in claim 1, wherein said writing position adjusting means detects a writing position in a main scanning direction in response to the output signal of said pattern sensing means, generates a correction signal corresponding to a deviation of the detected writing position and a reference position, and corrects a count of an image clock and a delay time on the basis of said correction signal.

3. A device as claimed in claim 1, wherein said pattern sensing means comprises a light emitting element and a light-sensitive element located to face a surface of the photoconductive element and symmetrically to each other in a vertical direction for sensing a regular reflection from said pattern image.

4. A device as claimed in claim 1, wherein said pattern sensing means comprises a light emitting element and a light-sensitive element which is located outside an optical path along which light emitted from said light emitting element is regularly reflected by the photoconductive element, thereby sensing a diffused reflection from said pattern image.

5. A device as claimed in claim 1, wherein said pattern sensing means comprises a light emitting element and a light-sensitive element facing each other with the intermediary of said pattern image for thereby sensing light transmitted through said pattern image.

6. A device for correcting a position for writing an image on a photoconductive element included in an image forming apparatus, said device comprising:

pattern forming means for forming a predetermined pattern image in a non-image area of the photoconductive element;

pattern sensing means for optically reading said pattern image; and writing position adjusting means for adjusting an image writing position in response to an output signal of said pattern sensing means representative of said pattern image, wherein said pattern image comprises a Z-shaped pattern, an image write signal being controlled such that a target image forming position of a center line of said Z-shaped pattern coincides with a center of a sensing range of said pattern sensing means.

7. A device for correcting a position for writing an image on a photoconductive element included in an image forming apparatus, said device comprising:

pattern forming means for forming a predetermined pattern image in a non-image area of the photoconductive element;

pattern sensing means for optically reading said pattern image; and writing position adjusting means for adjusting an image writing position in response to an output signal of said pattern sensing means representative of said pattern image, wherein said pattern image comprises a density pattern whose density changes in a main scanning direction, an image write signal being controlled such that a target image forming position of particular part of said density pattern coincides with a center of a sensing range of said pattern sensing means.

8. A method of correcting a position for writing an image on a photoconductive element included in an image forming apparatus, said method comprising the steps of:

a) writing a plurality of images of different colors on the photoconductive element by optical writing means to electrostatically form corresponding latent images;

b) developing each of the latent images by a toner of particular color by developing means to form a corresponding toner image;

c) illuminating the resulting toner images and sensing reflections from said toner images by an optical sensor; and d) correcting a position for writing an image on the photoconductive element by said optical writing means on the basis of the sensed reflections, wherein said step of writing a plurality of images of different colors on the photoconductive element includes:

writing the plurality of images of different colors on the photoconductive element which is a single photoconductive element for the plurality of images of different colors.

9. A method according to claim 8, wherein said step c) includes:

illuminating the resulting toner images which are on the single photoconductive element and sensing reflections from said toner images on the single photoconductive element by an optical sensor.

10. A method according to claim 9, wherein said step a) includes:

writing the plurality of images of different colors using a single rotating polygonal mirror and two light sources.

11. A method according to claim 10, wherein said step of writing a plurality of images of different colors on the photoconductive element includes:

writing the plurality of images of different colors on the photoconductive element which is a single photoconductive element for the plurality of images of different colors.

12. A method according to claim 11, wherein said step a) includes:

writing the plurality of images of different colors using a single rotating polygonal mirror and two light sources.

13. An image forming system comprising:

a rotating polygonal mirror;

two light sources which reflect light off of the rotating polygonal mirror;

a single photoconductive element;

a first charger for charging the single photoconductive element;

a first developer for developing a first latent image on the single photoconductive element, formed by a first of the two light sources, into a first toner image of a first color;

a second charger for charging the single photoconductive element having the first toner image thereon;

a second developer for developing a second latent image on the single photoconductive element, formed by a second of the two light sources, into a second toner image of a second color;

at least one pattern sensor for sensing the first and second toner images; and a correction device, connected to the at least one pattern sensor, which corrects a position where at least one of the first and second light sources form latent images using a relationship in positions between the first and second toner images, wherein said first and second developers develop the first and second toner image to at least partially overlap each other.

14. In an image forming apparatus in which a plurality of writing means, each being assigned to a particular color, form respective latent images on an image carrier and develop the respective latent images with toner of respective colors, a method of automatically adjusting writing positions of said plurality of writing means, comprising the steps of:

causing two of said plurality of writing means to form toner patterns for position adjustment of the respective colors;

sensing with an optical sensor changes in quantities of light reflected from or transmitted through the toner patterns of two different colors by sensing a relationship in positions between the toner patterns; and adjusting write start positions of the two writing means such that the toner patterns are formed at a position where an output of said optical sensor is one of a maximum and a minimum, wherein said step of causing two of said plurality of writing means to form toner patterns form the two toner patterns which at least partially overlap each other.

15. A method of correcting a position for writing an image on a photoconductive element included in an image forming apparatus, said method comprising the steps of:

a) writing a plurality of images of different colors on the photoconductive element by optical writing means to electrostatically form corresponding latent images;

b) developing each of the latent images by a toner of particular color by developing means to form a corresponding toner image;

c) illuminating the resulting toner images and sensing reflections from said toner images by an optical sensor; and d) correcting a position for writing an image on the photoconductive element by said optical writing means on the basis of the sensed reflections, wherein the reflections are total reflections.

16. A method of correcting a position for writing an image on a photoconductive element included in an image forming apparatus, said method comprising the steps of:

a) writing a plurality of images of different colors on the photoconductive element by optical writing means to electrostatically form corresponding latent images;

b) developing each of the latent images by a toner of particular color by developing means to form a corresponding toner image;

c) illuminating the resulting toner images and sensing reflections from said toner images by an optical sensor; and d) correcting a position for writing an image on the photoconductive element by said optical writing means on the basis of the sensed reflections, wherein the toner images are each provided with a greater dimension in a direction perpendicular to a direction for adjusting the position for writing than a dimension of a sensing range of said optical sensor in said direction perpendicular to said direction for adjusting.

17. A method of correcting a position for writing an image on a photoconductive element included in an image forming apparatus, said method comprising the steps of:

a) writing a plurality of images of different colors on the photoconductive element by optical writing means to electrostatically form corresponding latent images;

b) developing each of the latent images by a toner of particular color by developing means to form a corresponding toner image;

c) illuminating the resulting toner images and sensing transmitted light from said toner images by an optical sensor; and d) correcting a position for writing an image on the photoconductive element by said optical writing means on the basis of the sensed transmitted light, wherein the transmitted light is diffused transmitted light.

18. A method of correcting a position for writing an image on a photoconductive element included in an image forming apparatus, said method comprising the steps of:

a) writing a plurality of images of different colors on the photoconductive element by optical writing means to electrostatically form corresponding latent images;

b) developing each of the latent images by a toner of particular color by developing means to form a corresponding toner image;

c) illuminating the resulting toner images and sensing transmitted light from said toner images by an optical sensor; and d) correcting a position for writing an image on the photoconductive element by said optical writing means on the basis of the sensed transmitted light, wherein the toner images are provided with a greater dimension in a direction perpendicular to a direction for adjusting the position for writing than a dimension of a sensing range of said optical sensor in said direction perpendicular to said direction for adjusting.

* * * * *